United States Patent [19]

Thier et al.

[11] Patent Number: 5,369,735
[45] Date of Patent: Nov. 29, 1994

[54] METHOD FOR CONTROLLING A 3D PATCH-DRIVEN SPECIAL EFFECTS SYSTEM

[75] Inventors: Uri Thier; Oren Thier, both of West Hartford, Conn.; William Woodbury, Gainesville, Fla.

[73] Assignee: New Microtime Inc., Bloomfield, Conn.

[21] Appl. No.: 188,369

[22] Filed: Jan. 28, 1994

Related U.S. Application Data

[63] Continuation of Ser. No. 114,599, Aug. 31, 1993, abandoned, which is a continuation of Ser. No. 998,884, Dec. 28, 1992, abandoned, which is a continuation of Ser. No. 502,614, Mar. 30, 1990, abandoned.

[51] Int. Cl.⁵ ............................................. G06F 15/72
[52] U.S. Cl. .................................... 395/123; 395/125; 348/580
[58] Field of Search ............... 364/521, 522; 340/729; 358/22, 140; 395/123, 125, 127; 348/580, 583

[56] References Cited

U.S. PATENT DOCUMENTS

| | | | |
|---|---|---|---|
| 4,677,576 | 6/1987 | Berlin, Jr. et al. | 364/522 |
| 4,845,643 | 7/1989 | Clapp | 364/522 X |
| 4,860,217 | 8/1989 | Sasaki et al. | 364/522 X |
| 4,888,713 | 12/1989 | Falk | 364/522 |
| 5,053,762 | 10/1991 | Sarra | 348/578 X |
| 5,109,479 | 4/1992 | Williams | 395/125 |
| 5,124,693 | 6/1992 | Himelstein et al. | 395/127 X |

*Primary Examiner*—Mark K. Zimmerman
*Attorney, Agent, or Firm*—Cesari and McKenna

[57] ABSTRACT

A patch-driven video 3D special effects system constructs an output display of a desired three-dimensional shape with real-time video picture information displayed on the surface of the shape by dividing a video source plane into a plurality of polygonal patches and manipulating said patches in three dimensions to create the shape. The special effects system is controlled by a keyframing control system in which a small number of selected parameters are used to define several general purpose 3D shapes. These parameters are then specified in each keyframe. By varying the selected parameters, the general purpose object can be reshaped into a number of familiar shapes such as cubes, cones, etc. A predefined program converts the selected parameters into patch shapes and vertice positions which are used by the video special effects hardware to actually create the images.

4 Claims, 25 Drawing Sheets

PATCH PATTERNS

STEP 1: DESIGNATE PATCHES

STEP 2: REDUCE SIZE; ROTATE

STEP 3: FOLD UP

STEP 4: RECTANGULAR TUBE

| VIDEO FIELDS | N | N+1 | N+2 | N+3 | N+4 | N+5 | N+6 |
|---|---|---|---|---|---|---|---|
| SYSTEM COMPUTER | | | | | | | |
| a) COMPUTE AND STORE PARAMETERS FOR ONE VIDEO FIELD. | PIX A | PIX B | PIX C | PIX D | PIX E | PIX F | PIX G |
| b) SEND INPUT VIDEO SOURCE-TO-PATCH ASSIGNMENT DATA TO INPUT VIDEO PROCESSOR. | | PIX A | PIX B | PIX C | PIX D | PIX E | PIX F |
| c) SEND LINE COEFFICIENTS, PATCH NUMBERS, ORIENTATIONS, PRIORITIES, OUTPUT VIDEO SOURCE SWITCHING, TO PATCH DETECTOR. | | | PIX A | PIX B | PIX C | PIX D | PIX E |
| d) SEND TARGET-TO-SOURCE COEFFICIENTS AND PATCH NUMBERS TO MANIPULATOR | | | PIX A | PIX B | PIX C | PIX D | PIX E |
| INPUT VIDEO PROCESSOR SEND INPUT VIDEO TO FIELD BUFFER MEMORY. | | | PIX A | PIX B | PIX C | PIX D | PIX E |
| VIDEO FIELD BUFFER MEMORY | | | | | | | |
| a) WRITE VIDEO. | | | PIX A | PIX B | PIX C | PIX D | PIX E |
| b) READ VIDEO. | | | | PIX A | PIX B | PIX C | PIX D |
| PATCH DETECTOR | | | | | | | |
| a) SEND PATCH NUMBER TO MANIPULATOR. | | | | PIX A | PIX B | PIX C | PIX D |
| b) SEND KEYSTART AND VIDEO SWITCHING INFO TO OUTPUT VIDEO PROCESSOR. | | | | PIX A | PIX B | PIX C | PIX D |
| MANIPULATOR COMPUTE FIELD MEMORY READ ADDRESSES | | | | PIX A | PIX B | PIX C | PIX D |
| CALCODE COMPUTE FILTER CODES. | | | | PIX A | PIX B | PIX C | PIX D |
| OUTPUT VIDEO PROCESSOR | | | | | | | |
| a) SWITCH DATA SOURCES. | | | | PIX A | PIX B | PIX C | PIX D |
| b) INTERPOLATE KEY. | | | | PIX A | PIX B | PIX C | PIX D |

DATA FROM SYSTEM COMPUTER HELD FOR ONE FIELD BEFORE IMPLEMENTATION.

*FIG. 17*

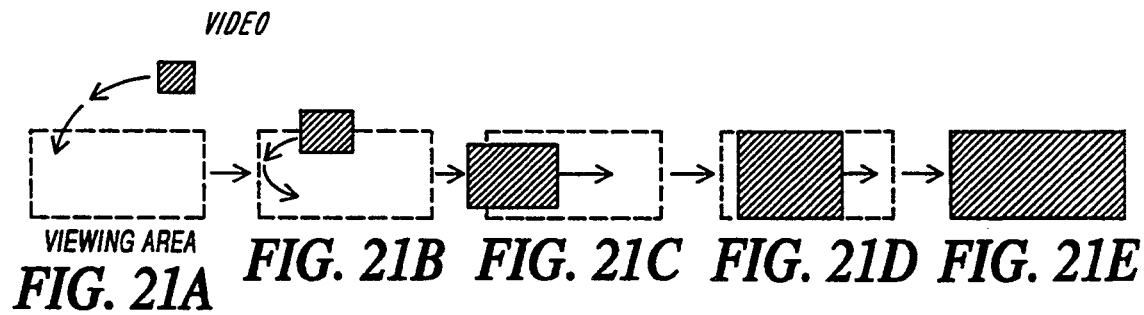
FIG. 21A  VIEWING AREA  FIG. 21B  FIG. 21C  FIG. 21D  FIG. 21E
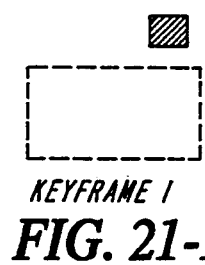
KEYFRAME 1
FIG. 21-1
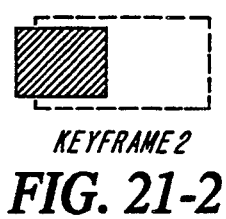
KEYFRAME 2
FIG. 21-2
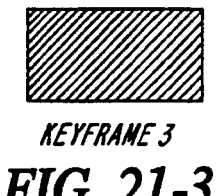
KEYFRAME 3
FIG. 21-3
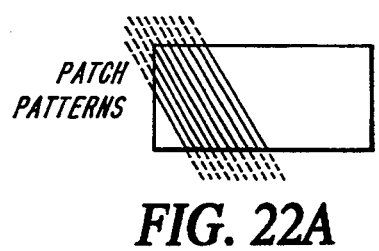
FIG. 22A
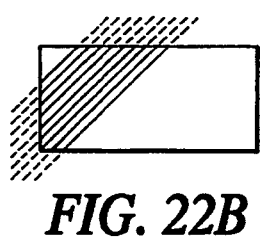
FIG. 22B
FIG. 22C
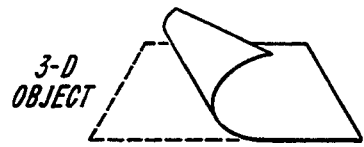
FIG. 22-1
FIG. 22-2
FIG. 22-3

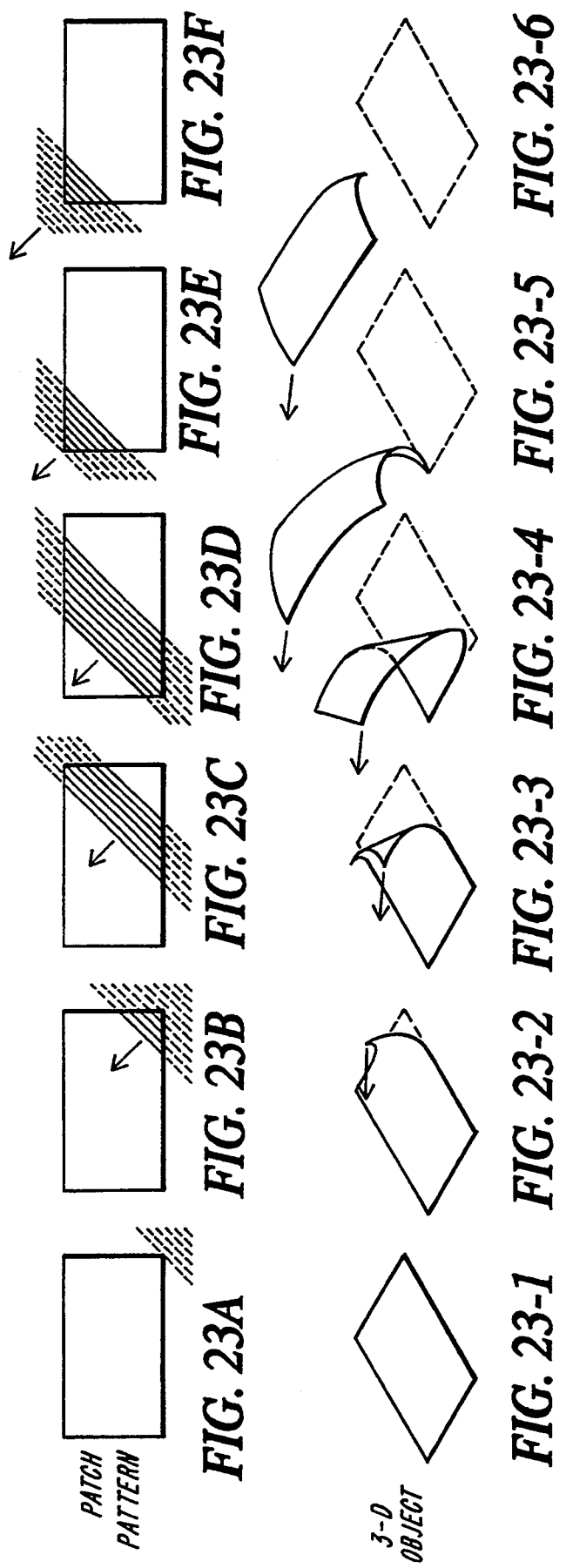

PATCH PATTERNS 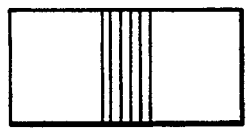  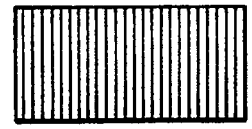
FIG. 24A        FIG. 24B        FIG. 24C
3-D OBJECT 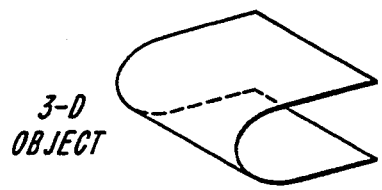 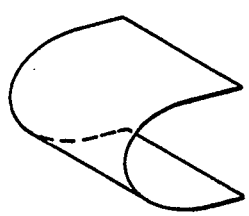 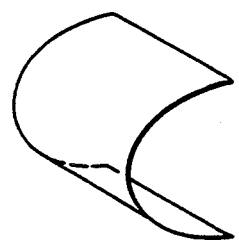
FIG. 24-1       FIG. 24-2       FIG. 24-3
PATCH PATTERNS  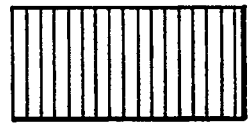 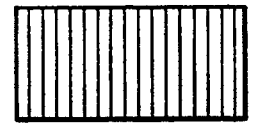
FIG. 26A        FIG. 26B        FIG. 26C
3-D OBJECT 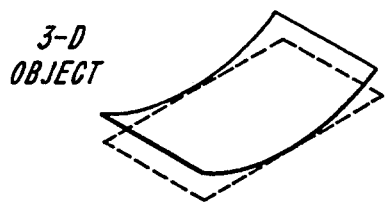 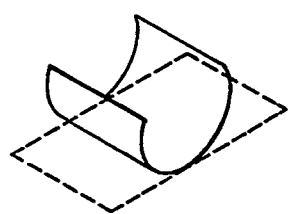 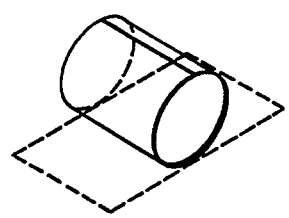
FIG. 26-1       FIG. 26-2       FIG. 26-3

PATCH PATTERNS

3-D OBJECTS

METHOD FOR CONTROLLING A 3D PATCH-DRIVEN SPECIAL EFFECTS SYSTEM

This is a continuation of U.S. patent application Ser. No. 08/114,599, filed on Aug. 31, 1993, now abandoned, which was a continuation of U.S. patent application Ser. No. 07/998,884, filed on Dec. 28, 1992, now abandoned, which was a continuation of U.S. patent application Ser. No. 07/502,614, filed on Mar. 30, 1990, now abandoned.

FIELD OF THE INVENTION

This invention relates to a video special effects and, more particularly, to a video special effects system which is capable of displaying real-time 3D video such as television images, that have been transformed in three dimensions, including perspective.

BACKGROUND OF THE INVENTION

Video special effect systems for spatially transforming two-dimensional real-time or "live" television video images are well-known. These systems are capable of generating two-dimensional video images which can be displayed and transformed in a variety of ways including rotation, translation and perspective manipulation.

A typical television special effects processor operates by first digitizing a normal analog television signal to generate a plurality of digital pixels which represent the digitized picture. The pixels for each television frame are then stored as "source" pixels in a field memory. The source pixels stored in the memory are sequentially used to generate output pixels in each scan line in the output picture. More specifically, a control circuit which has been programmed with the desired mathematical image transformation equations repetitively fetches source pixels from the memory. The source pixels are fetched from memory locations which will generate the next pixel on the output scan line. Using the image transformation equations, a transformation circuit computes the pixel value of the next pixel in order to generate an output transformed video signal. With specialized hardware, the entire process of storing and computing the transformed video information can be repeated at a rate sufficient so that the output video image changes at a television processing rate and produces "live" transformed television images. An example of such a system is shown in U.S. Pat. No. 4,631,750 entitled "Method and System for Spatially Transforming Images" issued on Dec. 23, 1986.

Special effects are normally displayed in sequences that span a series of video frames. In each step in the sequence the video image is transformed from one video field to the next video field in order to generate an overall effect which lasts a predetermined period of time. For example, the image may move, or translate, across the display screen, change size and rotate over a period of time. Such a sequence may involve thousands of slight individual transformations from field to field. Consequently, in order to display a special effects sequence, it may be necessary to carefully specify a long series of sequential transformations which will be carried out over a number of video fields. If the number fields spanned by the transformation is large, the manual specification of each individual transformation is tedious and time-consuming.

Therefore, conventional video special effects systems utilize a method called "keyframing" in order to allow a user to quickly compose effects. A keyframing system has two modes: a "program" mode in which the special effect sequence is defined and set up and a "run" mode in which the pre-defined effect sequence is shown on a live display.

In the program mode, in order to define a special effects sequence, a user defines one or more keyframes. Each keyframe is a set of parameter values which define the video image at a particular point in time during the effect sequence. Each effect sequence must have at least two keyframes: one at the start of the effect sequence and one at the end of the effect sequence. Other keyframes may also be defined between the starting keyframe and the ending keyframe at selected points in the sequence, for example, when the direction of movement changes or one effect changes to another. In addition, in the program mode, the user specifies the time duration between each keyframe in the pre-defined sequence. This time duration may be only one field or may extend across many fields.

After the keyframes have been defined, the special effects system software utilizes mathematical interpolation algorithms to generate transformation specifications for each unspecified video field which occurs in the effects sequence between keyframes. Thus, to create a special effects sequence, the user need only specify only a few keyframes at "key" points in the sequence.

Finally, in the run mode, the user and system specified sequence of transformations is run in a continuous process with live video displayed. After the user is satisfied with the effect, either the keyframe specifications or the entire sequence of transformations is stored for later playback.

For example, a simple effects sequence and the keyframes which define it are shown in FIGS. 21A–21E and 21-1 to 21-3. In the sequence shown in FIGS. 21A–21E, a reduced-size video image starts in a position at the top right corner of the viewing area (FIG. 21A). The image swings down and to the left side of the screen while increasing in size (FIGS. 21B and 21C). The image then moves to the right and further increases in size (FIG. 21D) so that at the end of the effect the image becomes full-sized and is centered (FIG. 21E). This effect sequence only varies three parameters: X, Y and Z position. The three keyframes which define the sequence are shown as keyframes 21-1, 21-2 and 21-3. All a user needs to do to define this sequence is to specify: 1) at what point in the sequence the keyframes occur; 2) what the X, Y and Z positions of the image are in each keyframe and 3) what kind of interpolation algorithms the system software will use to define the intermediate frames between the three keyframes. The system software then computes the image X, Y and Z positions for each field in the effect sequence.

While the aforementioned two-dimensional keyframing system is easy to setup and is capable of generating a variety of digital special effects at a real-time video rate and of simulating certain three-dimensional effects, it does not have true three-dimensional capability. For example, it is not possible with such a system to rotate a three-dimensional object with real-time video displayed on all surfaces as the object rotates.

There are several video special effects systems which are capable of generating true three-dimensional video special effects which can construct a three-dimensional object and then manipulate the constructed three-dimensional object by rotating it, translating it, etc. In the video special effects system described herein, a flat source surface is divided into a plurality of flat polygonal "patches" and a 3D surface is first constructed by manipulating the patches in three dimensions by rotating, translating and scaling each patch to construct the 3D surface. Then, in order to manipulate the entire constructed surface, the vertices of each patch are transformed in order to establish their location in the final transformed 3D shape. Once the patches have been transformed, real time video is mapped to each transformed patch face by using the target points in each patch to determine the necessary source points.

While the aforementioned keyframe method of specifying the desired effect sequence can be used with such a patch-driven system, additional complexities are introduced due to the number of parameters that must be specified in each keyframe. In a two dimensional system, only a small number of parameters such as X, Y and Z position, translation, scaling and perspective are applicable and need be manually specified in each keyframe. However, with the patch-driven 3D system, the parameters for each patch must be specified if the 3D object is to be constructed as part of the special effects sequence. If the 3D object consists of only a few patches, then only a small number of parameters must be specified in each keyframe, but a 3D object which is comprised of a large number of patches or which is curved requires the specification of a large number of parameters in each keyframe resulting in a time-consuming setup operation.

Accordingly, it is an object of the present invention to provide a method for controlling a patch-driven 3D video special effects system in which 3D objects can be quickly and easily defined.

It is another object of the present invention to provide a method for controlling a patch-driven 3D video special effects system which is compatible with conventional keyframe control.

It is still another object of the present invention to provide a method for controlling a patch-driven 3D video special effects system which allows complex 3D objects to be quickly defined with a small number of parameters for each keyframe.

It is yet another object of the present invention to provide a method for controlling a patch-driven 3D video special effects system which allows a 3D object with a pre-defined shape to be changed to another 3D object with another shape in the course of a special effects sequence.

SUMMARY OF THE INVENTION

The foregoing problems are solved and the foregoing objects are achieved in one illustrative embodiment of the invention in which a small number of selected parameters are used to define several general purpose 3D object shapes. These parameters are then specified in each keyframe. By varying the selected parameters, the general purpose object can be reshaped into a number of familiar shapes such as cubes, cones, etc. A pre-defined program converts the selected parameters into patch shapes and vertice positions which are used by the video special effects hardware to actually create the images.

More particularly, in addition to the conventional parameters used in keyframes to define two-dimensional objects (position, rotation, scaling, cropping and perspective), a new set of parameters is used which control the division of the input video plane into patches and how these patches are 'folded' into 3D objects. Then, the conventional parameters can be applied to the constructed object to allow a user to control its 3D position and orientation.

BRIEF DESCRIPTION OF THE DRAWING

FIG. 17 is a field rate sequence diagram showing the "pipelined" nature of the video processing. For example, when PIX A is being viewed, computations for PIX D are being made.

FIGS. 21A–21E are simplified diagrams of a conventional two-dimensional special effects sequence.

FIGS. 21-1 to 21-3 are keyframes used to define the effect sequence in FIGS. 21A-21E.

FIGS. 22A-22C illustrate the source video plane and the effect on patch placement of changing the patch orientation parameter.

FIGS. 22-1 to 22-3 illustrate the 3D objects resulting from the patch shapes and orientations shown in FIGS. 22A-22C, respectively.

FIGS. 23A-23F illustrate the source video plane and the effect on patch placement of changing the patch distribution center parameter.

FIGS. 23-1 to 23-6 illustrate the 3D objects resulting from the patch shapes and orientations shown in FIGS. 23A-23F, respectively.

FIGS. 24A-24C illustrate the source video plane and the effect on patch placement of changing the patch distribution width parameter.

FIGS. 24-1 to 24-3 illustrate the 3D objects resulting from the patch shapes and orientations shown in FIGS. 24A-24C, respectively.

FIGS. 25-1 to 25-6 illustrate the 3D objects resulting from the patch shapes and orientations shown in FIGS. 25A-25F, respectively.

FIGS. 26A-26C illustrate the source video plane divided into equal rectangular patches.

FIGS. 26-1 to 26-3 illustrate the effect on the constructed 3D object of changing the cylinder fraction parameter.

DETAILED DESCRIPTION OF THE PREFERRED EMBODIMENT

As previously mentioned, a patch-driven special effects processor operates by constructing a 3D surface from planar polygonal "patches" using conventional operations of rotation, translation and scaling on each patch. The entire constructed object is then manipulated in three dimensions by again using the conventional operations of rotation, translation and scaling on each patch.

After the final manipulations have been applied to each patch, the resulting transformation equations are inverted. The output pixel values are generated by using a patch detector circuit to identify the patch in which each output pixel is located. Once the patch identity has been determined, a manipulator circuit uses the inverted transformation equation information to generate selection addresses and filtering coefficients. The selection addresses are used to select source pixels from a field store memory and a high-speed filter/interpolator circuit then uses filter coefficients generated by a manipulator circuit to generate the output pixel values from the selected pixel values.

CREATION OF A 3D SURFACE BY PLANAR PATCHES

Figure 1:
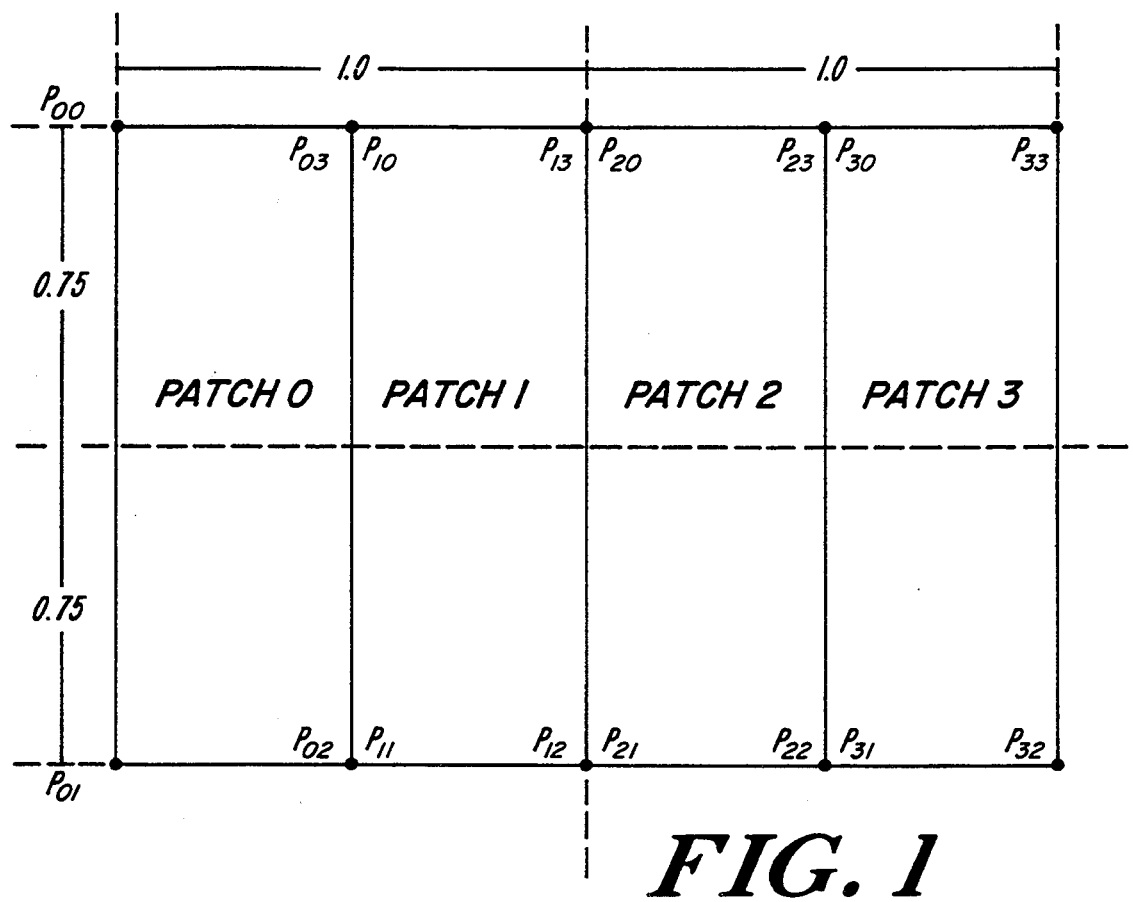
FIG. 1 of the drawing is a schematic illustration of a flat surface divided into a plurality of polygonal patches.

The following steps detail the theory behind the construction of a 3D surface in Cartesian (X,Y,Z) coordinates from planar patches. The planar patches are formed by dividing an initial two-dimensional planar source surface located in the XY plane (Z=0) between the limits Y=±0.75 and X=±1 as shown in FIG. 1. This source surface is representative of a conventional television raster with a 4:3 aspect ratio.

The source surface is divided into a plurality (N) of convex polygonal patches ("convex" means that all points on a a line connecting any two points within the polygon will also lie within the polygon). The total number of patches is determined by the surface to be constructed. For curved surfaces, the representation will only be approximate and the accuracy will improve as the number of patches increases. However, as the number of patches increases, the amount of processing circuitry required to process the patches also increases, in turn, increasing the system cost. Illustratively, a maximum of 64 patches has been chosen as a reasonable compromise. The actual number of patches used for a particular construction depends on the 3D surface (however, all patches must be convex). For the rectangular tube shown in FIG. 2, four patches are sufficient.

Each patch is given a number i, $0 < i < N-1$ as set forth in FIG. 1. A patch is uniquely defined by its corner points or vertices. Theoretically, the number of vertices for each patch is arbitrary, but, as the number of vertices increases, so does the amount of circuitry necessary to process the vertices. Illustratively, each patch has been chosen to have four vertices. In their source location, the four vertices for each patch vertex can be represented as four row vectors defined by the equations:

$$PS_j = [X_j \ Y_j \ 0 \ 1], 0 \leq j \leq 3 \quad (1)$$

Thus, the set of row vectors for all of the patches in their source positions is defined by the equation:

$$PS_{ij} = [X_{ij} \ Y_{ij} \ 0 \ 1], 0 \leq i \leq N-1, 0 \leq j \leq 3 \quad (2)$$

Although all of the patches initially begin in the XY plane, the final location of each patch in the constructed surface can be altered independently of the other patches, by translation, rotation and scaling about the X, Y and Z axes by the following well-known transformation matrices.

Scaling of each axis dimension $$S = \begin{bmatrix} S_x & 0 & 0 & 0 \\ 0 & S_y & 0 & 0 \\ 0 & 0 & S_z & 0 \\ 0 & 0 & 0 & 1 \end{bmatrix}$$

Rotation about the Z axis $$R(\alpha) = \begin{bmatrix} \cos\alpha & \sin\alpha & 0 & 0 \\ \sin\alpha & \cos\alpha & 0 & 0 \\ 0 & 0 & 1 & 0 \\ 0 & 0 & 0 & 1 \end{bmatrix}$$

Rotation about the Y axis

-continued $$R(\beta) = \begin{matrix} \cos\beta & 0 & -\sin\beta & 0 \\ 0 & 1 & 0 & 0 \\ \sin\beta & 0 & \cos\beta & 0 \\ 0 & 0 & 0 & 1 \end{matrix}$$

Rotation about the $X$ axis $$R(\gamma) = \begin{matrix} 1 & 0 & 0 & 0 \\ 0 & \cos\gamma & \sin\gamma & 0 \\ 0 & -\sin\gamma & \cos\gamma & 0 \\ 0 & 0 & 0 & 1 \end{matrix}$$

Translation by an amount $Tx$, $Ty$ and $Tz$ along $X$, $Y$ and $Z$ axes $$T = \begin{matrix} 1 & 0 & 0 & 0 \\ 0 & 1 & 0 & 0 \\ 0 & 0 & 1 & 0 \\ Tx & Ty & Tz & 1 \end{matrix}$$

To construct a particular surface, the patch movement required to place the patch in its final position must be derived and the overall movement converted to the elements required by the matrices S, R($\alpha$, $\beta$, $\gamma$) and T.

After the matrix numbers have been determined, a confined matrix can be derived by multiplying the matrices to form an overall patch transformation matrix $S_p \cdot R_p \cdot T_p$. This patch matrix is then used to transform each patch vertex location PSij into a target vertex location PTij by means of the equation:

$$PTij = PSij \cdot S_p \cdot R_p \cdot T_p \qquad (3)$$

where PSij is the source location of the patch vertex (i) which is transformed to the target location $PT_{ij}$.

Figure 2A:
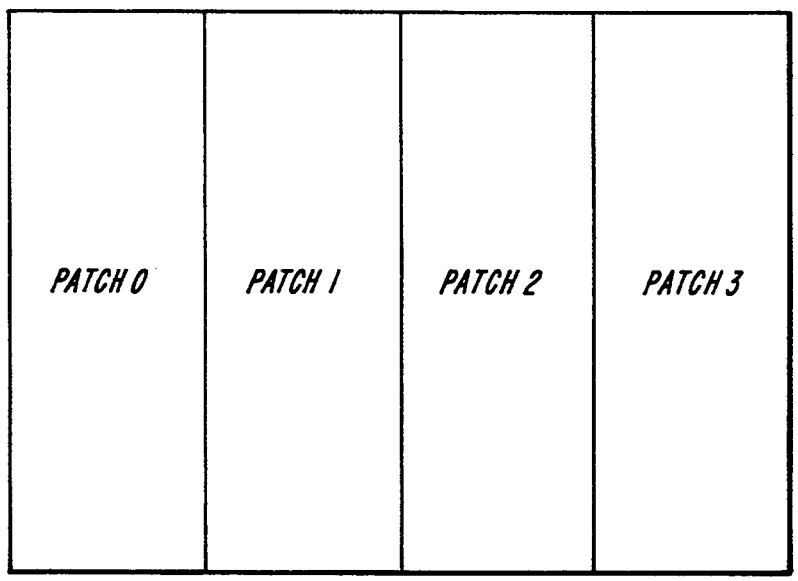
FIGS. 2A, 2B, 2C and 2D are schematic illustrations of a four-step construction of a 3D rectangular tube using the patches set forth in FIG. 1.
Figure 2B:
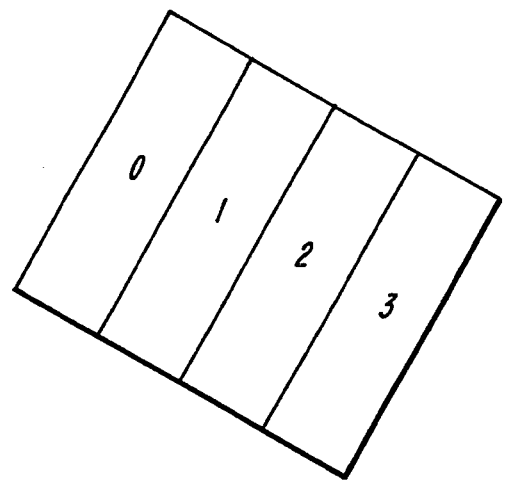
Figure 2C:
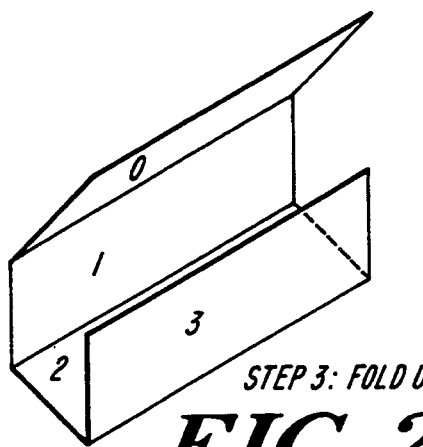
Figure 2D:
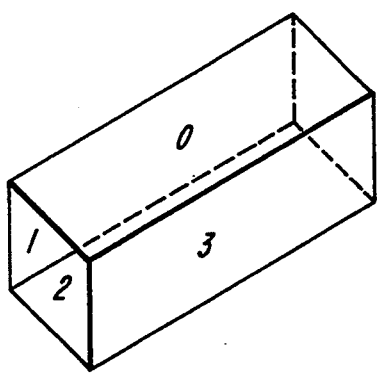

The total evolution process from the initial planar source surface to the constructed 3D surface is divided into discrete steps which can be separately displayed on the screen. An example of the step-by-step construction of a 3D surface using this method is shown in FIGS. 2A–2D in which a rotated rectangular tub is constructed. As shown in FIG. 2A, the initial planar surface is divided into the four patches set forth in FIG. 1. The next two steps in the evolution are shown in FIG. 2B in which the initial plane is scaled and rotated. In step 2C the patches are further rotated to "fold up" the flat initial surface into the final tubular surface shown in FIG. 2D. For flexibility, the construction process can be halted after any step in the evolution and the speed of evolution can also be varied. However, if real-time video information is to be mapped to the constructed surface, there is an implied limitation that each step in the evolution must remain static for at least the time interval of one television field.

Once the 3D surface has been formed by the separate transformation of each patch, the entire surface can be moved as a unit in three-dimensional space by multiplying each patch transformation matrix $PSij \cdot S_p \sim R_p \cdot T_p$ by an object transformation matrix $S_o \cdot R_o \cdot T_o$ whose elements are determined by the final object orientation in three-dimensional space. The resulting vertex final locations POij are thus computed as follows:

$$POij = PSij \cdot S_p \cdot R_p \cdot T_p \cdot S_o \cdot R_o \cdot T_o \qquad (4)$$

Equation (4) determines the vertex locations of the patches in a constructed "wireframe" surface. Next, the Z-axis position or "depth" of each patch (relative to a viewer at point $Z_o$ on the Z axis) must be determined so that hidden surfaces can be removed from the transformed shape when real-time video information is mapped to the 3D surface. Finally, the transformed location of each patch vertex in the constructed surface must be projected onto a two-dimensional "viewport" area representative of a television display area.

The transformed patches are given depth and projected onto the video viewport by multiplying each transformed point POij by a perspective matrix P, where $$P = \begin{matrix} 1 & 0 & 0 & 0 \\ 0 & 1 & 0 & 0 \\ 0 & 0 & 0 & -1/Z_o \\ 0 & 0 & 0 & 1 \end{matrix}$$

and $Z_o$ is the distance from the point POij to the position of a hypothetical viewer located on the Z axis in the three-dimensional space. Thus, the final location of the patch vertex points on the viewport surface is given by the equation:

$$PVij = POij \cdot P \qquad (5)$$

The result of the above transformations is a set of four matrix equations for each patch, each equation of the set representing the transformations necessary to move one patch vertex from its source location to its target location on the planar viewport. The parameters of the viewport are chosen to give it a 4:3 aspect ratio so that it is representative of a conventional television display area. The coefficients corresponding to each matrix equation are dependent on the constructed shape and its transformation. Since the construction of the shape is carried out in steps in which each step remains static for one or more video fields, the coefficients can be determined prior to each video field and stored. In addition, the locations PVij of the patch vertex points can be calculated and stored. The stored coefficients and locations will then govern the display for that entire video field.

As previously mentioned, it is possible to define both the patch transformations and the object transformations in a set of keyframes by using a set of the conventional parameters (position, translation, scaling and perspective) for each patch and for the constructed object. For a simple object which uses only four patches (such as that shown in FIGS. 1 and 2), the keyframe definitions involve a relatively small number of parameters. However, for more complicated objects, such as those which involve 20 or 30 patches, the number of parameters quickly increases to a large number. In addition, when the patches are manipulated in three dimensions to construct a three-dimensional object, care must be taken to keep the patch boundaries on adjacent patches together in order to prevent the object from "breaking up" and to prevent "holes" from appearing in the final video display. The number of parameters and their relationships make the process of defining each keyframe difficult and time-consuming.

In accordance with one aspect of the invention, a new set of parameters are chosen which parameters define a general purpose 3D "object" shape and do not depend on the number of patches. Changes in the inventive parameters cause the general purpose object to change shape into a desired shape or from one desired shape into another. This latter set of parameters can then be defined in each keyframe to quickly and easily define many given special effects sequences.

More particularly, the inventive set of parameters includes parameters which specify how the source planar surface is to be divided into patches. Other parameters specify how the selected patches are folded to construct a desired 3D shape and still further parameters specify the final characteristics of the constructed shape. The conventional parameters of position, translation, scaling and perspective can then be applied to the constructed shape to move the shape in the viewing field.

The inventive parameters and their relation to patch shapes and manipulations will be described in detail after the following discussion concerning the operation of the patch-driven video special effects system.

MAPPING OF REAL-TIME VIDEO TO THE CONSTRUCTED SURFACE

Advantageously, in accordance with the invention, once the matrix coefficients and the transformed location of the patch vertex points have been determined, real-time video is mapped to the constructed surface by using the transformed target points to select the source pixels necessary to determine the target pixel value. Thus, it is not necessary to transform each source pixel by means of the computed transformation coefficients. More particularly, before each video field begins it is possible to invert the aforementioned matrix equations to determine inverted coefficients. It is possible to do this inversion because each patch is planar and thus the matrix equations which determine its transformation are linear. Consequently, the calculations which are necessary to invert the matrix are sufficiently simple that they can be carried out with a reasonable amount of hardware within the time limit of one television field interval. The inverted equations can then be applied to each target point to determine the pixel or pixels which must be processed to result in the final target pixel.

More particularly, in accordance with the inventive mapping method, it is only necessary to scan the output viewport and determine in which patch or patches each output point lies. Once the patch is identified, the inverted equations can be used to select source pixels for processing.

At the start of each video field, digitized pixels are stored in a random access field memory to provide a set of source pixels. Each pixel sample is timed to coincide with the scan point locations on the viewport surface. The inventive mapping process requires that the two-dimensional viewport surface be scanned in discrete steps or target points. The scanning is conducted in a sequence which coincides with a conventional television display sequence -horizontally and vertically from the upper left corner of the space to the lower right corner of the space.

Figure 3:
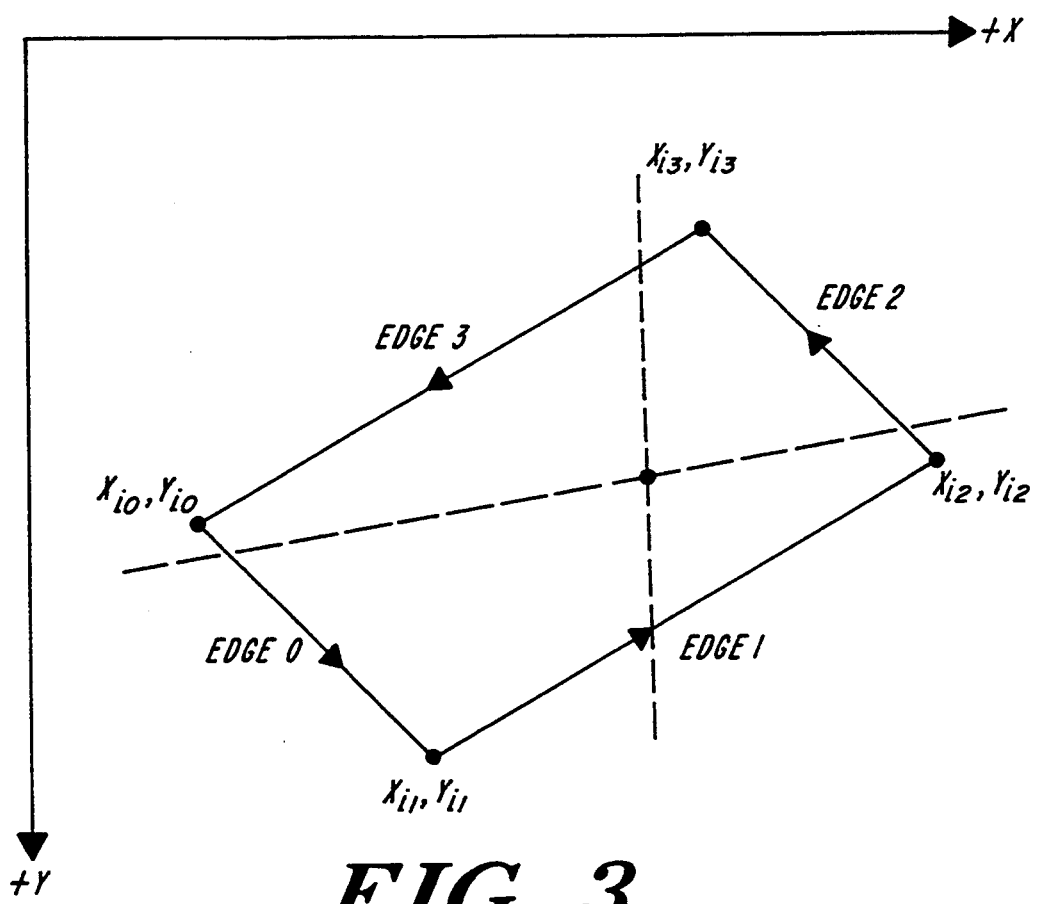
FIG. 3 is a diagram of an illustration indicating the method of operation of a patch detector circuit which determines whether a target scan pixel lies within a particular patch.

At each scanning step, the viewport is examined to determine whether the target point is located within the boundaries of one or more patches, or whether the target point is located outside the boundaries of all the patches. The location of the target point relative to patch boundaries requires the determination of the patch boundaries. Each boundary is considered to be a straight line edge connecting two vertices as shown in FIG. 3. For example Edge 0 is the straight line connecting vertex $X_{io}$, $Y_{io}$ to the vertex $X_{i1}$, $Y_{i1}$. Similarly, Edge 1 is the straight line connecting vertex $X_{i1}$, $Y_{i1}$ to the vertex $X_{i2}$, $Y_{i2}$. When the patch boundaries are selected in this way, equations for the patch boundaries can be written in the form:

$$A(PV_{ij})X + B(PV_{ij})Y + C(PV_{ij}) = 0 \qquad (6)$$

where the coefficients A, B and C can be computed using the stored patch vertex locations $PV_{ij}$ determined in equation (5). (Illustratively, in FIG. 3, for edge 0, the A, B and C coefficients are given by $A = Y_{i0} - Y_{i1}$, $B = X_{i1} - X_{i0}$ and $C = Y_{i1}(x_{i0} = x_{i1}) - x_{i1}(y_{i0} - Y_{i1})$. Similar expressions can be derived in a straight-forward manner for the coefficients for edges 1-3). Each patch also acquires an "orientation" characteristic (clockwise or counterclockwise) which depends on the direction in which the vertices are approached when computing the three coefficients (the orientation is "counter-clockwise" in FIG. 3). As described below, in order to prevent ambiguity when a point is located on the boundary of a patch, the coefficients are always computed with a counter-clockwise orientation.

In order to determine whether a given scan point is within the boundaries of a particular patch, the X and Y coordinates of the scan point are inserted into the four equations for the patch boundaries of that patch. Unless the scan point lies on the patch boundary so that equation (6) is satisfied, the calculated result will be non-zero (either positive or negative). In accordance with conventional, well-known mathematical theory, for a given scan point, if all four equations for a patch yield a computed result with the same sign (all positive for a counter-clockwise orientation or all negative for a clockwise orientation), the scan point is located within the patch boundaries.

Thus, for each scan point, the results of four equations in the form (6) for each patch in the constructed 3D shape are computed to determine whether the point lies within one or more of the patches. Since the A, B and C coefficients are computed with a counter-clockwise orientation, all signs will be positive. (If the patch has been manipulated in three dimensions so that it has "flipped over" causing its orientation to be clockwise, the computation software generates an "orient" signal which is used to correct the signs during the patch detection process). In the case where the scan point is within the boundaries of more than one patch, then the depths or Z positions of the patches determine which patch will be selected for display (patches closest to the viewer are selected for display).

Once a patch has been selected, it can be used to retrieve the stored inverted coefficients which were computed at the beginning of the video field. From these coefficients, as previously mentioned, it can be determined how the patch source pixels must be manipulated in order to generate the target pixel value. The process of patch selection and the computation of the output pixel value must be performed during the time interval allocated to each scanning step (approximately 70 nanoseconds for real-time video information).

More particularly, when the patch selection process determines the patch number corresponding to a particular scan point, the scan point X and Y coordinates are used in the inverse equations to yield the location in the field memory of a set of pixels. These pixels are retrieved, combined and filtered to generate an output pixel value which is displayed at the location of the scan point on the television display. At each scan point which lies within a particular patch the inverse equations remain the same, but as the scan point leaves one patch and enters another, the equations for pixel retrieval change. If a scan point is located outside the boundaries of all patches, a predetermined background signal is displayed on the television display.

VIDEO SPECIAL EFFECTS SYSTEM

The patch-driven video special effects system consists of a communication and control circuit and a video processing unit. The communication and control circuit provides an interface between the system user and the video processing unit, distributes data between the various system resources and computes transformation matrix and filter coefficients for video processing. The video processing unit digitizes analog video information and stores the resulting source pixels. Based on data computed by the communication and control circuit, the video processing unit identifies a patch in which an output scan point lies, retrieves the appropriate stored source pixels and performs the necessary filtering and manipulation to generate output analog video for display. The video processing unit also performs conventional video processing such as mosaic, posterization and cropping on the video signal.

Figure 4:
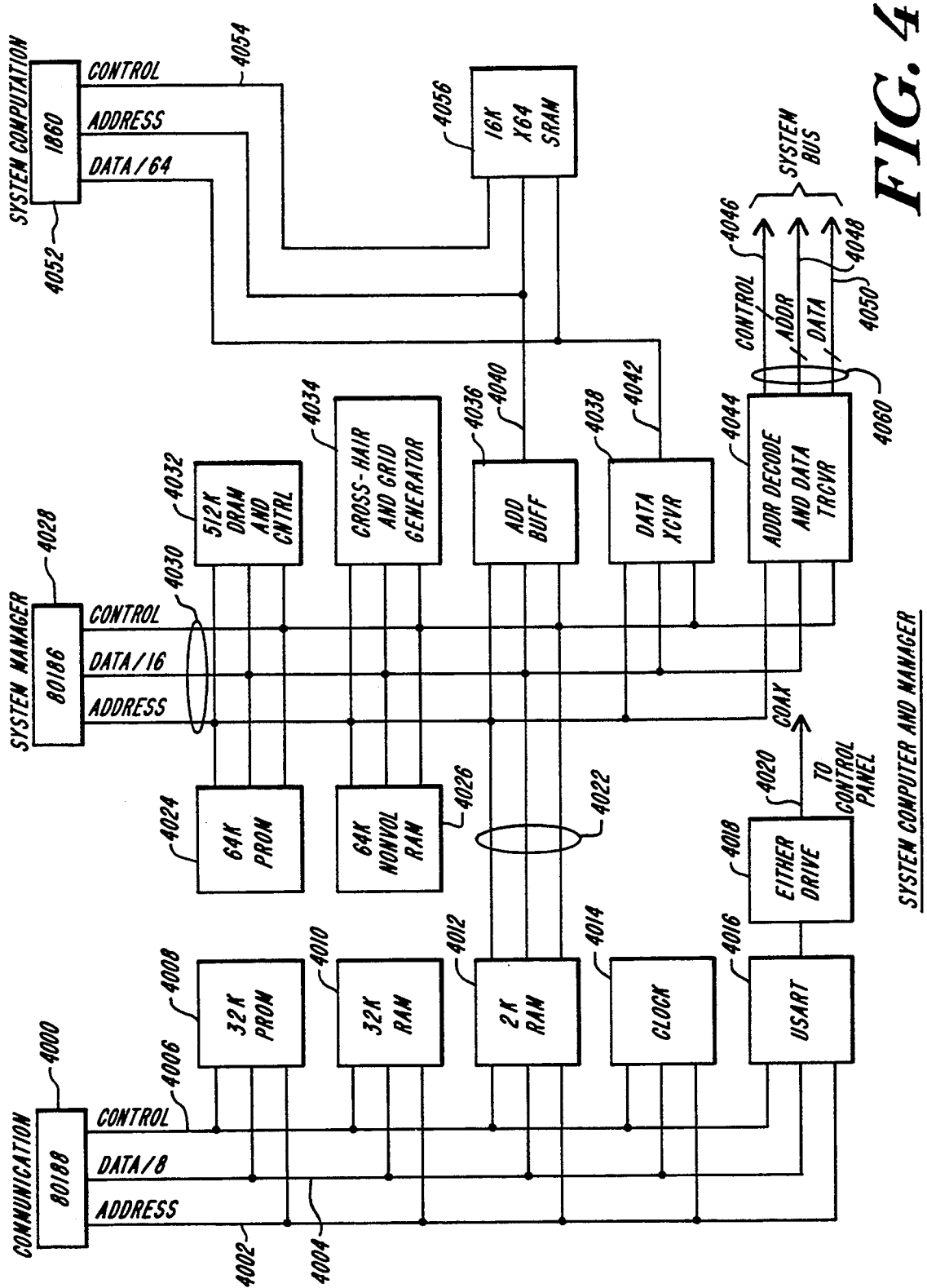
FIG. 4 is an electrical schematic block diagram of the communication and control circuitry of a patch-driven video special effects system.

FIG. 4 illustrates the major functional components of the communication and control circuit which is comprised of three separate computers and supporting elements. More particularly, the special effects system is controlled from a conventional control panel (not shown) which may include joysticks, pushbuttons and other programmable input devices that allow the user to specify various special effects which are to be generated by the system. A control panel suitable for use with the present embodiment is designated as an RP-1 control panel manufactured by Microtime, Inc., 1250 Blue Hills Avenue, Bloomfield, Conn.

Commands generated by the control panel are recognized and processed by processor 4000 which may illustratively be microprocessor model number 80188 manufactured by Intel, Incorporated, located at 3065 Bowers Avenue, Santa Clara, Calif. 95051. Microprocessor 4000 is connected by means of multi-wire computer buses 4002-4006 to a plurality of peripheral units including 32K PROM memory 4008, 32K RAM memory 4010, 2K RAM memory 4012, clock generator 4014 and transceiver (USART) 4016. In a conventional fashion, three separate buses interconnect functional units—address bus 4002, eight-bit data bus 4004 and control bus 4006. Although these buses are shown as single heavy lines in FIG. 4, they, in fact, consist of multiple wires.

The commands are provided, via coax cable 4020, to an ETHERNET drive unit 4018. This is a conventional interface circuit which converts ETHERNET signals on the coax cable 4020 into digital signals suitable for controlling the special effects system. The converted digital signals are provided to transceiver 4016, which, in turn, synchronizes the signals and generates the appropriate address and data signals on address and data buses, 4002 and 4004 which convey the signals to processor 4000.

Processor 4000 is driven by clock signals generated by a clock unit 4014 and operates under control of a program stored in the 32K PROM 4008. Processor 4000 also has use of a 32K RAM memory 4010 in which to store data. The program is designed to recognize signals generated by the control panel as commands for manipulating the video signals and to convert the commands into control signals for controlling the computation processor and the video processing unit as will hereinafter be described. A programmed priority allows more critical instructions generated by the user to be handled first followed by less critical instructions. It is also possible that a particular manipulation sequence could be pre-programmed and loaded directly into memory 4010 and control the operation of the special effects system. In either case, the program which controls processor 4000 is conventional and will not be discussed in detail herein.

In response to the user commands, processor 4000 generates coded instructions which are temporarily stored in 2K RAM 4012. RAM 4012 is a conventional dual-port memory which has a second bus set, 4022, that is connected to an internal communication bus 4030 that is, in turn, connected to processor 4028. Processor 4028 may illustratively be a model 80186 microprocessor manufactures by Intel Incorporated. Thus, commands generated by processor 4000 can be written into memory 4012 and later read by processor 4028 at an appropriate time during system operation.

Computer 4028 acts as a system manager and determines whether the instructions stored in RAM 4012 are forwarded to computation computer 4052 or to the video processing unit (not shown in FIG. 4) via system bus 4060.

More specifically, processor 4028 operates under control of a program stored in 64K PROM 4024. The results of computations by processor 4028 can be stored in 512K DRAM 4032 and in 64K non-volatile RAM unit 4026. Also connected to communication bus 4030 is a conventional crosshair/grid generator 4034 which can generate a crosshair cursor and grid pattern on the video display screen that allows the user to manipulate the special effects more easily.

Processor 4028 examines the commands generated by processor 4000 stored in RAM memory 4012. If the commands are designated to control computation computer 4052, they are routed, via bus 4022, data transceiver 4038 and computation bus 4042 to computer 4052. Alternatively, commands can be routed, via bus 4022 and address decode/data transceiver unit 4044 to system bus 4060 and from there, to the video processing unit (not shown in FIG. 4).

All high-speed floating-point and fixed-point computations are performed by the system computation computer 4052. A computer suitable for use with the illustrative embodiment is a high-speed 64-bit computer as a model i860 manufactured by the Intel Corporation. Such a computer typically has a clock frequency of 33 megahertz. Processor 4052 computes the matrix coefficients, the inverse coefficients and other mathematical computations necessary for the manipulation of the video signals.

The results of the computations are provided, via 64-bit bus 4054, to 16K SRAM (static RAM) memory 4056. All values computed by computer 4052 during a television field are stored in memory 4056 until the next television field, at which time, the values are distributed to the video processing unit under control of processor 4028.

In order to make the distribution, processor 4028 accesses memory 4056 via address buffer 4036. Data in memory 4056 is read and provided to computation bus 4042 and from there, via data transceivers 4038 and 4044, to system bus 4060 and the video processing unit.

Figure 5:
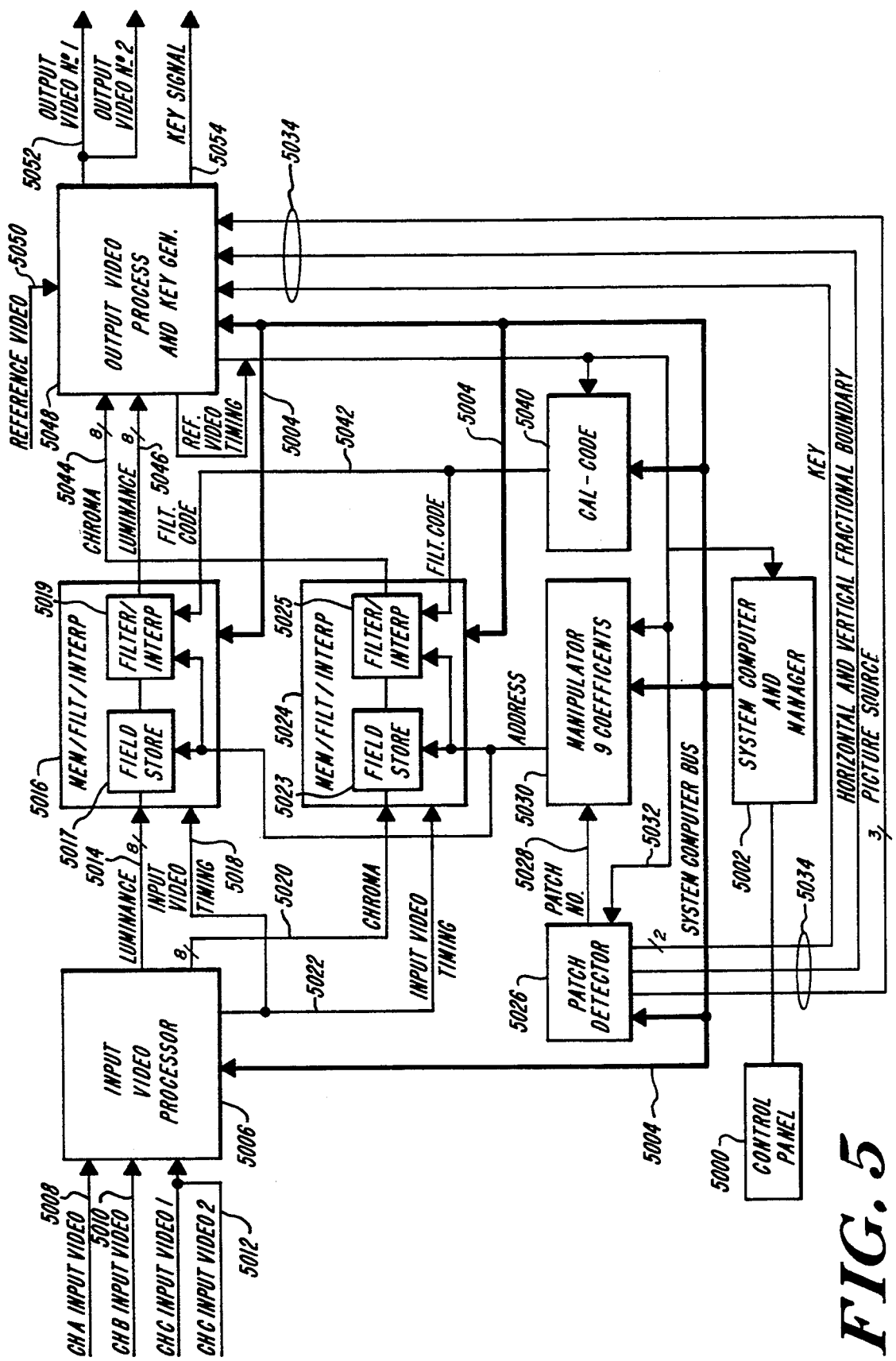
FIG. 5 is an electrical schematic block diagram of illustrative video signal processing circuitry.

A general block diagram of the video processing unit is shown in FIG. 5. As previously mentioned, system manager 5002 (discussed in detail with respect to FIG. 4) generates command and control information for the video processor unit on system bus 5004 which information coordinates the operation of all of the elements of the video processing unit. Under control of the signals on bus 5004, input video processor 5006 accepts live analog video on three separate channels 5008, 5010 and 5012, digitizes the analog information, retimes the signals so that they are synchronized with respect to each other, separates the chrominance and luminance information and extracts timing information from the sync and burst signals to generate various timing signals.

The digitized luminance information for all three channels is time-multiplexed onto eight-bit bus output bus 5014 and provided to field memory/filter unit 5016, which contains field memory 5017 and filter/interpolator 5019. The information stored in memory 5017 represents the source pixel array. Selected pixels in this array are retrieved and processed by filter/interpolator 5019 to generate the output pixel values as will be discussed in detail below.

The separated chroma signals are provided (via an eight-bit bus on which the three channels are time-shared similar to the luminance information) to a separate memory/filter circuit 5024 which consists of field memory 5023 and filter/interpolator 5025. The luminance and chrominance signals are processed in parallel to decrease the processing time of the system. Timing information generated by input video processor 5006 is also provided, via bus 5022, to both memory/filter unit 5016 and memory/filter unit 5024.

As previously mentioned, during operation of the system, the system computer and manager 5002 computes and stores information, including forward and inverse transform coefficients, that is necessary to construct a desired three-dimensional surface. These coefficients and the target point position are provided, via system bus 5004, to patch detector 5026. Detector 5026, as previously mentioned, determines in which patch a target scan point lies. Also provided to patch detector 5026 is retimed reference video information via bus 5032. This reference information is generated by output video processor 5048 from a reference signal 5050.

In response to the coefficient and reference information, patch detector 5026 generates a coded patch number on bus 5028 which identifies the patch in which the target scan point lies. In addition, patch detector 5026 produces output codes on buses 5034 indicating whether or not the output scan point is part of a key signal, the source of video information (which channel generated the video information) and horizontal and vertical fractional boundary information. The fractional boundary information is necessary to properly position output pixels which lie on, or close to, a patch boundary.

At the beginning of each field, system computer 5002 loads manipulator circuit 5030 with the coefficients of the inverse transforms as discussed above. During the next field time and, in response to the reference video information on bus 5032 and a patch number on bus 5028 generated by patch detector 5026, manipulator 5030 generates address information which is provided to luminance field store 5017 and chrominance field store 5023. The address information selects the particular source pixels which are to be used to generate the target pixel.

The pixels are retrieved from stores 5017 and 5023 and provided to filter/interpolator circuits 5019 and 5025. These circuits act to filter and interpolate the source signals to generate the target pixel value. The processing of the source pixels by filter/interpolators 5019 and 5025 is, in turn, controlled by a filter code signal generated by calcode circuit 5040. Calcode circuit 5040 receives information from system computer 5002 and the reference video information on bus 5032 and generates a coded signal which controls the filters to generate an output luminance signal on bus 5044 and an output chrominance signal on bus 5046.

The luminance and chrominance signals are provided to an output video processor 5048 which recombines the separated luminance and chrominance information. In response to the horizontal and vertical boundary information generated by patch detector 5026 on buses 5034, output video processor 5048 performs an additional interpolation if the source pixels are close to the boundary of a patch. In addition, the output video processor also generates key signals, if appropriate, and performs some additional further conventional processing such as trails, sparkles and other special effects. Finally, blanking and timing signals are added back to the video signal to produce an output analog video signal on bus 5052 and a key signal, if appropriate, on bus 5054.

Figure 6:
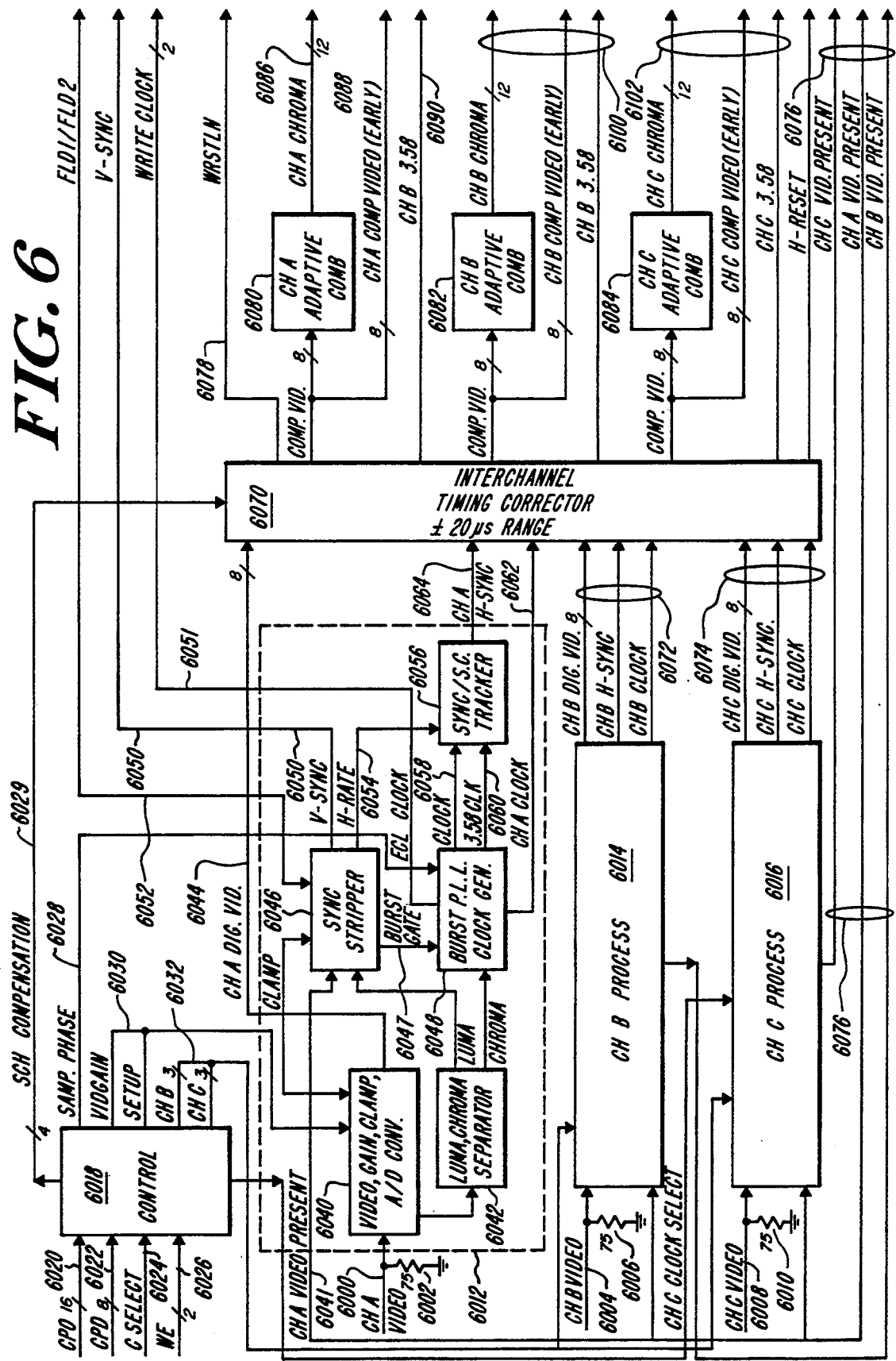
FIG. 6 is an electrical schematic block diagram of an analog video processor circuit which receives incoming analog video information on three separate channels, digitizes the information, separates luminance and chrominance signals, retimes and filters the video information.

FIG. 6 shows the input video processor 5006 in more detail. More particularly, live analog video from three separate sources designated as Channel A (CH A), Channel B (CH B) and Channel C (CH C) is received at inputs 6000–6008, which are terminated by 75-ohm resistors 6002–6010, respectively. Illustratively, the three video sources must be timed to within 20 microseconds of each other for the input video processor to properly compensate for timing differences. Within the processor, the processing for each channel is identical and, for purposes of clarity, only the processing circuitry of Channel A will be described in detail.

The operation of the analog video processor can be controlled by the user from the special effects control panel through the system manager as discussed with respect to FIG. 4. As previously mentioned, the system manager communicates with the input video processor by means of a system bus which includes 16-bit address bus 6020, eight-bit data bus 6022 card select line 6024 and 2-bit write enable bus 6026. The signals on the latter lines are provided to processor control unit 6018 which decodes the address, data and control signals to generate video gain, hue and setup signals. The bus address, data and control lines enable a user to control the video gain, setup level and encoding (sampling) clock phase (hue) used by the input video processor. In response to the signals, control unit 6018 generates control signals, including: a D.C. sampling phase signal (line 6028), D.C. signals for video gain and setup level (for Channel A on lead 6030 and for Channels B and C on leads 6032) and a four-bit interchannel time compensation control signal (on bus 6029).

Under control of unit 6018, each of the video signals present at inputs 6000–6008, is digitized and processed to separate the luma and chroma information and recover video timing signals. In particular, the analog video at input 6000 is provided to a video gain, clamp and A/D converter circuit 6040. Circuit 6040 is a conventional circuit in which the composite analog video signal (comprised of luminance and chrominance information) is encoded into an eight-bit digital video signal on eight-bit output bus 6044. In addition, the analog composite video information is provided to a luma/chroma separator circuit 6042 which separates the luma and chroma information.

The luma information is provided to sync stripper circuit 6046 which detects and regenerates various timing signals present in the luma information. In particular, circuit 6046 produces a clamping signal which is applied to, and controls, the absolute signal level into the A/D converter circuit 6040. Circuit 6046 also generates: (a) FLD1/FLD2 signal on lead 6052 indicating which of the two video fields is being processed; (b) vertical sync pulses on lead 6050 indicating the start of each picture field; (c) a horizontal rate signal on lead 6054 which is used to generate horizontal timing pulses (d) a burst gate signal on lead 6047 which is used to isolate the burst signal and (e) a video present signal on lead 6041 which indicates whether Channel A has actual video present.

The burst gate signal on lead 6047 and chroma information from separator circuit 6042 are provided to phase-locked-loop circuit 6048 which is a conventional timing circuit that extracts color subcarrier clock information on lead 6058 and regenerates the 3.58 megahertz burst clock on lead 6060. P.L.L. circuit 6048 also generates a write clock signal on lead 6051 and a 3.58 megahertz clock signal on lead 6062.

The clock signal on lead 6058, the 3.58 megahertz burst signal on lead 6060 and the horizontal rate signal on lead 6054 are provided to sync tracker circuit 6056 which regenerates horizontal timing pulses (synchronized to the 3.58 megahertz signal on lead 6060) on lead 6064 that indicate the start of each scan line.

The digital video information on lead 6044, the horizontal sync pulses on lead 6064 and the clock signal on 6062 are provided to an interchannel timing corrector 6070. Similar signals are developed by Channel B processing circuit 6014 on leads 6072 and Channel C processing circuitry 6016 on leads 6074.

Interchannel timing corrector 6070 is a conventional circuit which uses the horizontal sync information to retime the video in Channels B and C to the video in Channel A. The corrector has a $\pm 20$ microsecond range so that the allowed timing variations in the input signals can be accommodated. The interchannel timing corrector generates a write start line signal WRSTLN on line 6078 which signal is used to synchronize the remainder of the circuitry. Interchannel timing corrector 6070 also generates digitized composite video and a 3.58 megahertz clock for each of the three Channels A, B and C.

The retimed, digitized composite video is produced on lead 6088 and the retimed burst clock is produced on lead 6090. The composite video for each channel is also filtered to extract the chroma information by means of a conventional comb filter. In particular, composite video for Channel A is provided to adaptive comb filter 6080 to extract and Generate chroma information on lead 6086. Illustratively, cow filter 6080 may be a conventional three-path comb filter. However, preferably, filter 6080 is arranged to examine the incoming stream of pixels and to modify the "comb" filter to a "notch" filter when adjacent pixel similarity falls below a predetermined threshold. This change is necessary since the efficiency of a conventional comb filter depends on close similarity of adjacent pixels. In this manner, the filtering action can be optimized to suit a particular video display.

Similarly, comb filter 6082 processes the video signal in Channel B and comb filter 6084 processes the signal in Channel C producing output signals 6100 for channel B and 6102 for channel C respectively. The video present signals on leads 6076 generated by processing circuits 6012–6016 are also provided to the remainder of the circuitry.

Figure 7:
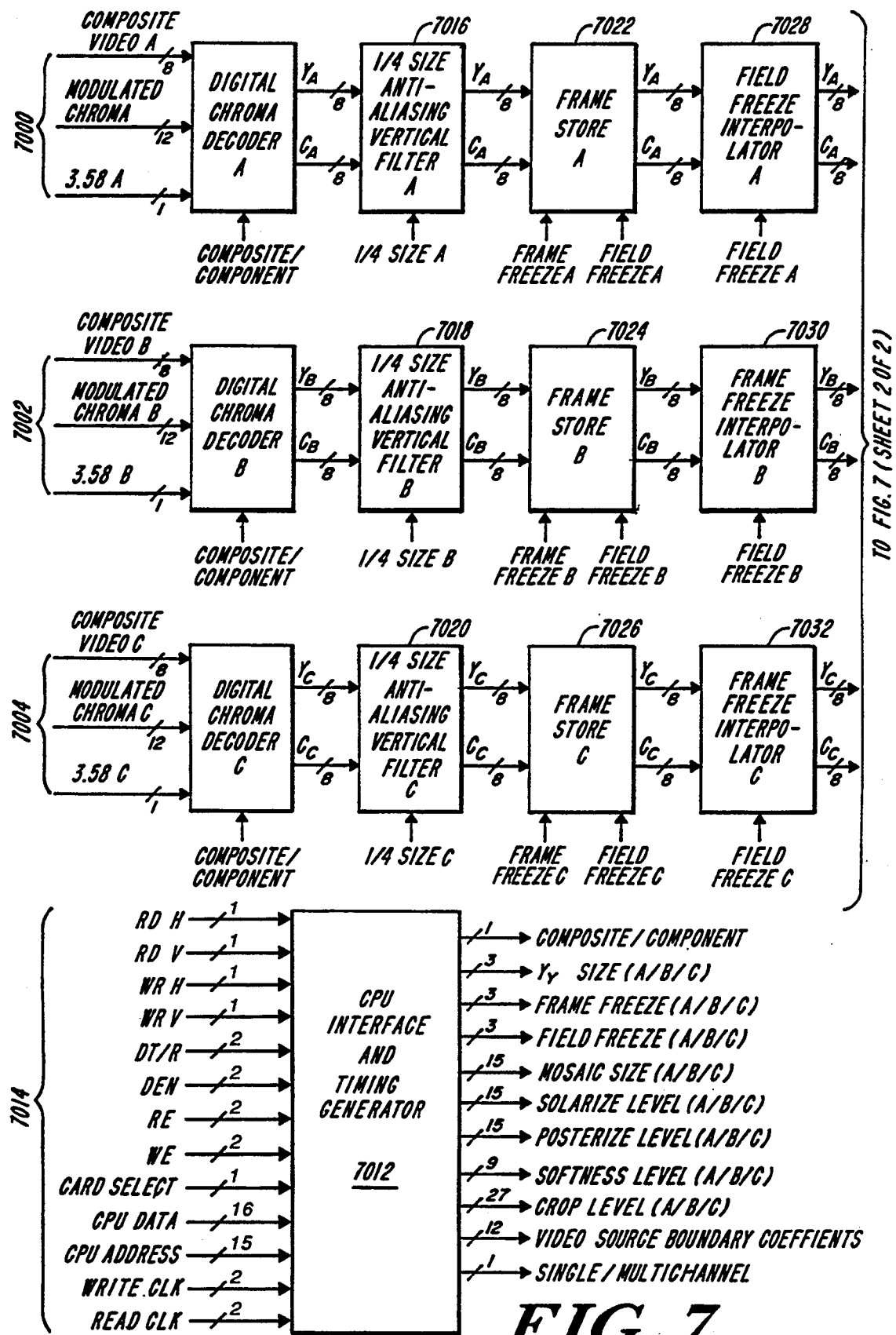
FIG. 7 is an electrical schematic block diagram of a digital video processor unit which stores a frame of digitized video information for frame freeze effects, performs special effects processing such as mosaic, posterization and cropping and selects one of the three channels for further processing.

The composite video signal, the isolated chroma signal and the 3.58 megahertz clock signal developed for each of the three channels is further processed in the input video processor circuitry shown in FIG. 7. Each of the three channels is processed in a similar manner under control of command and control signals developed by the communication and control system described in connection with FIG. 4.

Command signals 7014 are provided to a CPU interface and timing generator circuit 7012. Signals 7014 include horizontal read and vertical read enable leads, horizontal and vertical write enable leads, a card select signal, a 16-bit data bus, a 15-bit address bus and write and read clocks. In response to signals 7014, CPU interface and timing generator circuit 7012 develops a plurality of control signals which control the video processing components shown in FIG. 7. The control signals include a composite/component signal which determines whether the components of each of the video signals or the entire composite signal is processed; a quarter-size compression signal (which will hereinafter be described in more detail) which causes the picture in each of the channels to be compressed to one-quarter size. Also included are field-freeze and frame-freeze signals, which are used to freeze either a field or a frame of the video signal and signals which control various conventional special effects such as the mosaic, solarization, posterization, softness and cropping.

More particularly, the composite video, isolated chroma and burst clock signals generated by the circuitry shown in FIG. 6 for channel A are provided as signals 7000 to digital chroma decoder circuit 7006. In a similar manner, video signals 7002 for channel B are provided to chroma decoder 7008 and signals 7004 for channel C are provided to chroma decoder 7010. In a conventional decoder circuits such as decoder 7006, the isolated chroma signal is subtracted from the composite video signal to generate a video signal luminance component. After the luminance component has been generated, the chroma signal is digitally demodulated into a multiplexed data stream of baseband (R-Y, B-Y) chroma components. The output of chroma decoding circuit 7006 is an eight-bit luminance signal on a luminance bus YA and an eight-bit chrominance signal on chrominance bus CA. These latter two buses pass through the remainder of the circuits that, in turn, generate the various video special effects processed by the system. Similar processing is provided for channels B and C so that luminance information is provided to the circuitry on buses YB and YC and chrominance information is provided on buses CB and CC.

More particularly, after the luminance and chrominance signals are generated for each of the three channels, the three video signals (each comprised of luminance and chrominance information) are written into frame stores 7022–7026 to provide a delay of one picture frame. Frame stores 7022–7026 may also be used to "compress" the picture to one-quarter size by writing alternate pixels. When picture compression is performed, additional anti-aliasing vertical filters 7016–7020 are controlled by interface circuit 7014 (via the "¼ Size" signals) to process the signal prior to storage in stores 7022-7026. Frame stores 7022-7026 may also be used to "freeze" the picture by cessation of the writing function (under control of the "Frame Freeze" signal). An entire frame, or either field (under control of the "Field Freeze" signal), may be stored and continually read independently from each buffer. In the case when the picture is "frozen" for a field, interface circuit 7014 controls field freeze interpolators 7028-7032 to cause additional interpolation on the signal.

Other ancillary functions, e.g. mosaic picture (performed by conventional circuits 7034-7038), posterization (performed by circuits 7040-7048), solarization (circuits 7042-7050), picture cropping (circuits 7052-7056) and color border, can also be performed under control of interface circuit 7014 independently on each of the three channels.

The video data stream in each of the three channels A, B and C is provided to a digital multiplexer 7058. Under control of the system computer and manager, multiplexer 7058 allows any of the three data streams to be switched to the output of the analog video processor for subsequent storage in a video field buffer to provide the set of source pixels for generation of the output pixels. In particular, the three video channel signals can be switched sequentially in order to write any one of the three signals into predetermined sections of the field buffer memory under control of the video source boundary coefficients generated by interface 7014. In this way, multiple picture sources may be displayed via a single picture channel. For example, if the "front" and "back" of a page in a "page turn" simulation are both to be displayed, video from two separate sources must be written to proper locations in the video field buffer memory.

Alternatively, one-quarter-size compressed video in each of the three separate channels (obtained from frame stores 7022-7026 as previously described) can be written into separate sections of the field buffer memory. The stored source pixels may then be retrieved and mapped to three visible faces of a cube which can then be manipulated in three dimensions.

Since three video signals are processed simultaneously, all these signals may be written independently to dedicated video frame buffers to allow processing of two full-color video signals plus a luminance signal which can be used as a key signal. Consequently, special effects, such as intersection of two full-sized live video pictures, may be produced using the multi-channel capability. The key signal may be made to "track" either or both of the video channels to produce many other effects in conjunction with a conventional production switcher.

Figure 8:
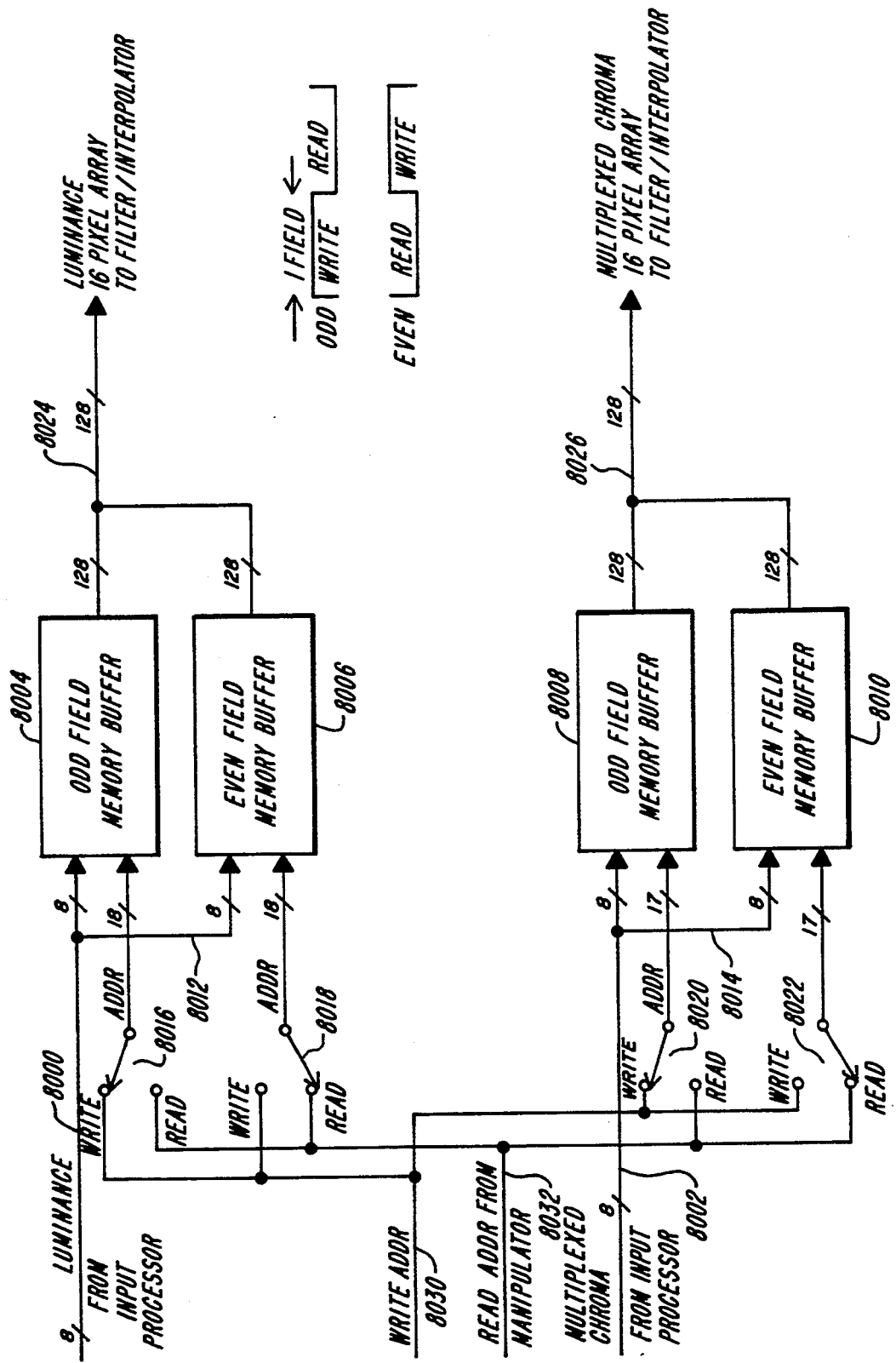
FIG. 8 is an electrical block schematic diagram of an overlapping read/write field store memory.
Figure 9:
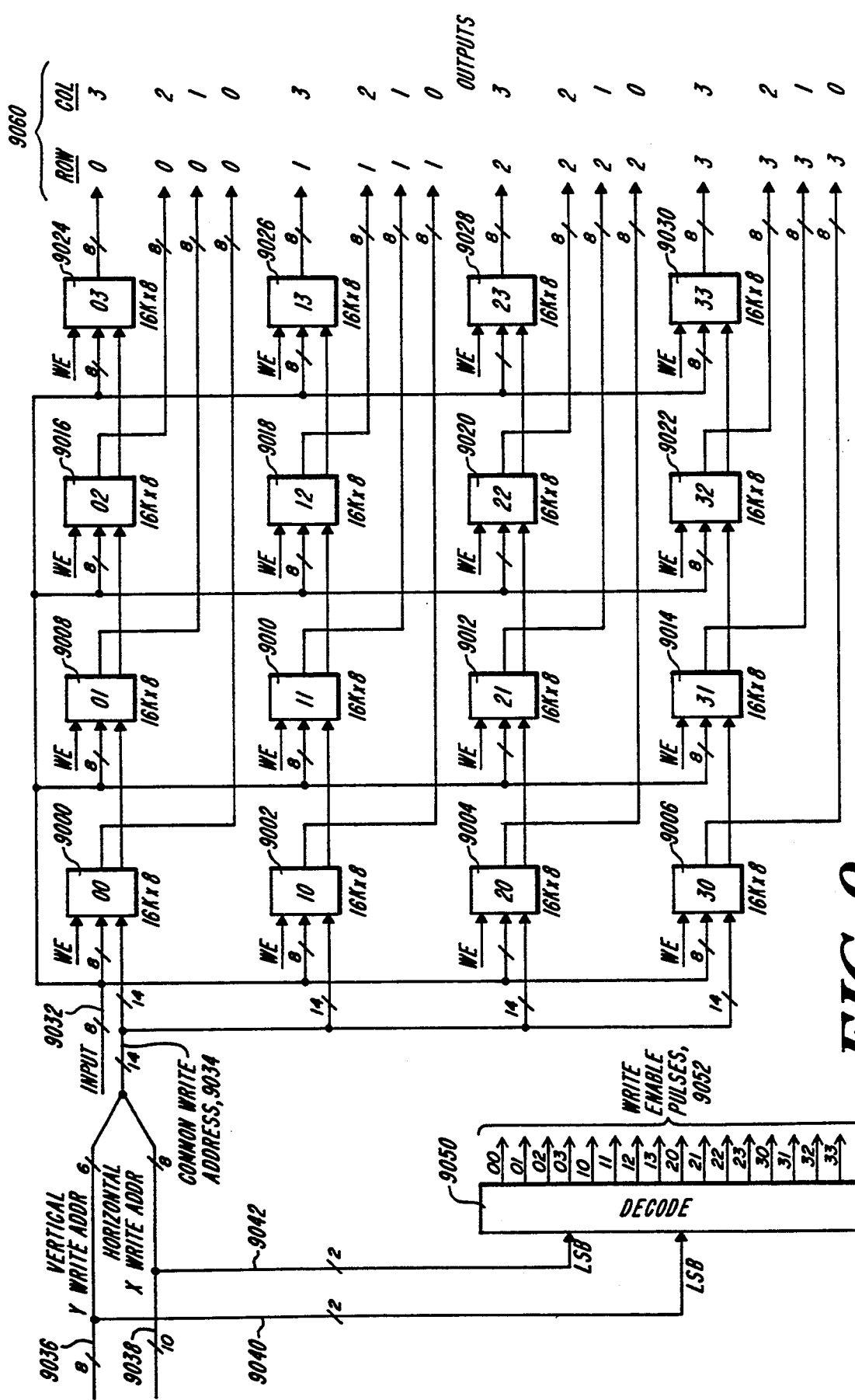
FIG. 9 is a more detailed electrical schematic block diagram of one field memory buffer in the field store memory of FIG. 8.
Figure 10:
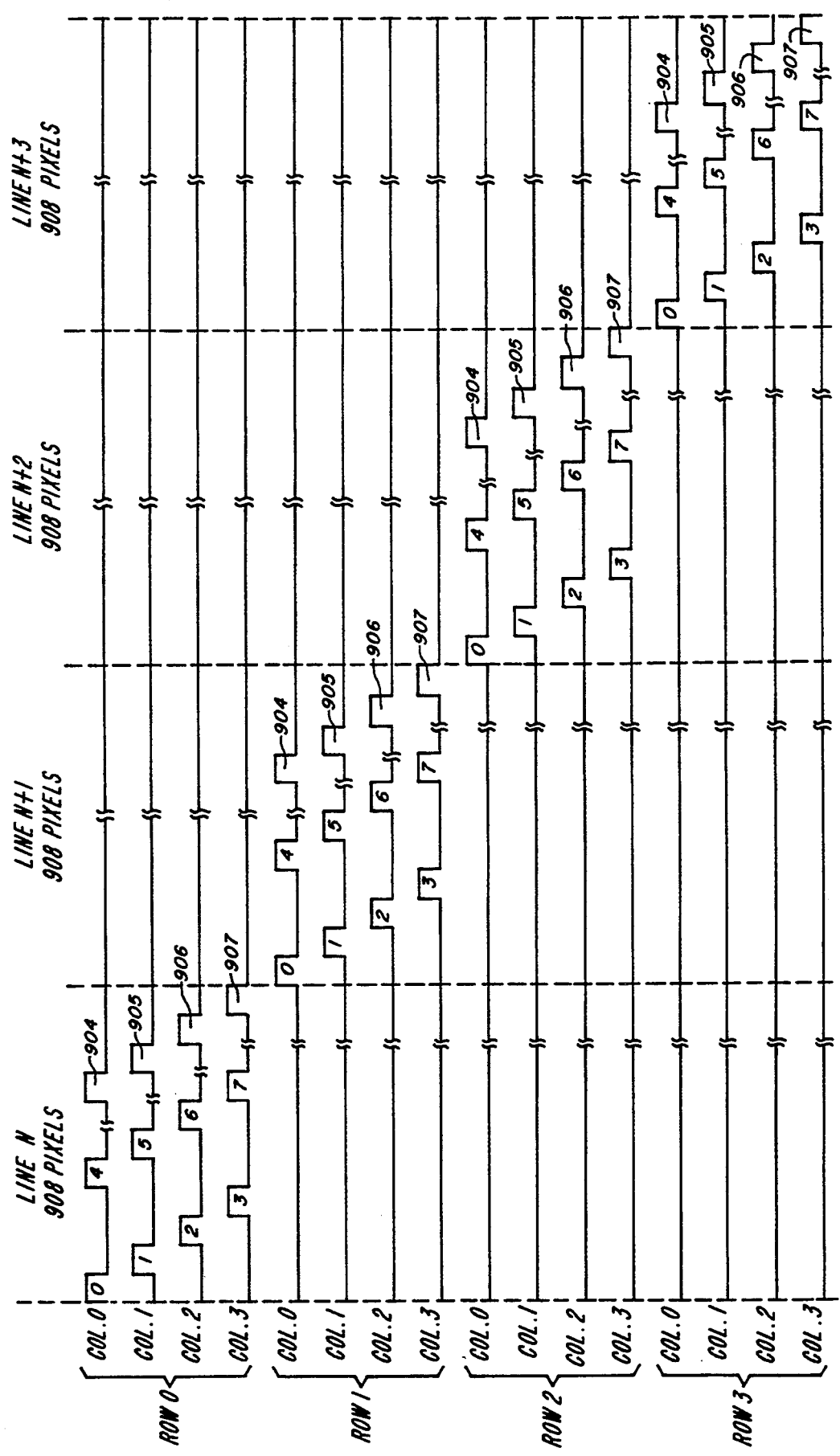
FIG. 10 is a timing chart of the field memory in filter-/interpolator circuit of FIGS. 8 and 9.

As previously mentioned, the multiplexed output of the analog video processor is provided to a field buffer memory which stores a set of input or source pixels that are subsequently used (as will be described in more detail) to generate each output pixel. FIGS. 8, 9 and 10 show the detailed arrangement of an illustrative field buffer memory.

More specifically, FIG. 8 shows a basic block schematic diagram of the complete buffer memory which consists of four separate memory units. Two memory units are used to store luminance information and two memory units are used to store the multiplexed chroma information. The luminance memory section and the chrominance memory section are each comprised of two memory units: an odd field memory unit and an even field memory unit. The incoming video data stream is written into one memory unit for one video field. During the next video field, the incoming data stream is written into the other memory. Consequently, during a video field while one memory unit is being written, the other one memory unit can be can be read, thereby avoiding the necessity of a dual port memory.

More particularly, the luminance field memory buffer is comprised of odd field memory unit 8004 and even field memory unit 8006. In a similar manner, the chrominance field memory buffer is comprised of an odd field memory unit 8008 and an even field memory unit 8010. The eight-bit luminance signal generated by the input processor is provided, via buses 8000 and 8012, to the inputs of the odd and even luminance field memory units 8004-8006 and the outputs of the memories are ORed together. In a similar manner, the eight-bit multiplexed chrominance signal is provided, via buses 8002 and 8014, to the inputs of odd and even chrominance memory units 8008 and 8010, respectively and the outputs of the memories are ORed together.

Luminance memory units 8004-8006 are both provided with an 18-bit address from either 18-bit write address bus 8030 or 18-bit read address bus 8032 (the 18-bit address consists of an 8-bit vertical address and a 10-bit horizontal address). Address information on write address bus 8030 is generated by counters whose initial count conditions are under system control.

As will be hereinafter described, the 18-bit read address is generated by a "manipulator" circuit which generates the address based on patch numbers and priority signals. Both write address bus 8030 and read address bus 8032 are provided to a pair of address switches, 8016 and 8018, which control the address provided to the luminance memory section. These switches are connected so that when write address signals on bus 8030 are provided to odd field memory unit 8004, read address signals are connected, via switch 8018, to even field memory unit 8006 and vice versa. Consequently, during one video field, write address information on bus 8030 is provided, via switch 8016, to the odd field memory unit causing it to sequentially store an entire field of eight-bit pixels of luminance information generated by the input processor. During the same video field, read address information from the manipulator circuit on bus 8032 is provided, via switch 8018, to the even field memory unit causing selected portions of the luminance information stored during the previous field to be read out. During the next video field, the positions of switches 8016 and 8018 are reversed causing the input information to be written into even field memory unit 8006 and read out of odd field memory unit 8004.

In a similar manner, multiplexed chroma information is written into and read from chroma memory units 8008 and 8010 under control of address signals on buses 8030 and 8032 provided via switches 8020 and 8022.

In response to each pixel address sequentially generated by the manipulator circuit, the luminance information read from memory units 8004 and 8006 and the chrominance information read from memory units 8008 and 8010 consists of a 4×4 pixel array (the array consists of 16 eight-bit pixels or a total of 128 bits) which surrounds the source pixel identified by the manipulator address. The 16-pixel array is provided via outputs 8024 and 8026 to a filter/interpolator circuit which combines the pixel values to generate a single output or target pixel in accordance with a predetermined filtering algorithm.

As will be hereinafter described in detail, in order to allow 16 pixels to be retrieved from memories 8004–8010 with the assertion of a single read address from the manipulator circuit, the input pixels are systematically written into the memories in a predetermined, cyclic pattern. In particular, the internal organization of each memory unit is shown in FIG. 9. Each unit (for example, odd field memory unit 8004) is comprised of sixteen memory circuits 9000–9030 arranged in a four-by-four array (arbitrarily arranged and designated as rows 0–3 and columns 0–3).

Pixel data to be written into the memory unit is received on 8-bit bus 9032 which is connected in parallel to the data inputs of all 16 memory circuits. Each memory also receives a 14-bit write address on address bus 9034 which is connected in parallel to the write address ports of all 16 memories 9000–9030 (generation of the read address information will be discussed in connection with FIG. 10).

The 14-bit write address consists of the six most significant bits of the eight-bit vertical write address provided on bus 9036 and the eight most significant bits of the 10-bit horizontal write address provided on bus 9038.

The two least significant bits of the vertical write address on bus 9040 and the two least significant bits of horizontal write address on bus 9042 are provided to a write enable pulse decoding circuit 9050. This circuit decodes the four input bits on buses 9040 and 9042 and generates one of 16 write enable pulses, which is provided to one of the 16 memories 9000–9030. During a writing operation, the memories are sequentially pulsed by decoder 9050 so that each sequential pixel out of the incoming pixel pulse stream is written into a selected memory at the location specified by the 14-bit common address.

The timing of the write enable pulses is shown in FIG. 10. In particular, each video scan line consists of 908 pixels which are sequentially stored in four memories comprising a row of the four-by-four array. For each line (for example line "N"), the first pixel to arrive (pixel 0) is stored in memory 9000 or row 0, column 0; the second pixel (pixel 1) is stored in memory 9008 or row 0, column 1; the third pixel (pixel 2) is stored in memory 9016 or row 0, column 2; and the fourth pixel (pixel 3) is stored in memory 9004 or row 0, column 3. This writing cycle then repeats itself with the fifth pixel (pixel 4) being stored in memory 9000, the sixth pixel (pixel 5) in memory 9008 and the seventh pixel (pixel 6) in memory 9016 and the eighth pixel (pixel 7) in memory 9024. The writing pattern repeats until the entire 908 pixels of the scan line have been stored in memories 9000, 9008, 9016 and 9024.

The next video line (line N+1) of 908 pixels is stored in a similar manner in memories 9002, 9010, 9018 and 9026. Similarly, the third line (line N+2) is stored in memories 9004, 9012, 9020 and 9028 and the fourth line is stored in memories 9006, 9014, 9022 and 9030. This cycle then repeats itself with the next line of pixels being stored in the first row of memories (memories 9000–9024) the next line being stored in the next row of memories (memories 9002–9026), etc. This cyclic storage pattern allows a 4×4 pixel array to be read from the memory unit with each read address generated by the manipulator circuit.

More particularly, as previously described, the 16 memory circuit array is read by means of an 18-bit read address generated by the manipulator circuit in a manner to be described in detail below. The connection of the read address signals to the 16 memory circuit array is shown in detail in FIG. 11 (memories 1100–1130 correspond to memories 9000–9030). The 18-bit read address signal consists of a 10-bit horizontal read address signal (bits X0–X9) which is provided to the memory array via bus 1174 and an eight-bit vertical read address (bits Y0–Y7) provided on bus 1176. As will hereinafter be described, since the pixels are stored in a fixed, cyclic pattern in memories 1100–1130, the address signals provided by the manipulator circuit on buses 1174 and 1176 must be internally modified in order to "move" the 16 pixel array by one pixel in the horizontal direction or one scan line in the vertical direction in response to an increment in the least significant bit of the manipulator address. This modification is necessary so that the 16-pixel array can be centered over any particular pixel in the memory to generate the required output target pixel.

As shown by Tables 1 and 2, this modification is done by selectively adding the least significant bits of both the horizontal and vertical address to the remainder of the address in a predetermined pattern.

TABLE 1

| Alteration of horizontal read addresses provided to each column of memory circuits | | | | |
|---|---|---|---|---|
| To move array to the right by: | Add To Col 0 | Add To Col 1 | Add To Col 2 | Add To Col 3 |
| 0 pixels | 0 | 0 | 0 | 0 |
| 1 pixel | 1 | 0 | 0 | 0 |
| 2 pixels | 1 | 1 | 0 | 0 |
| 3 pixels | 1 | 1 | 1 | 0 |

TABLE 2

| Alteration of vertical read addresses provided to each row of memory circuits | | | | |
|---|---|---|---|---|
| To move array down by: | Add To Row 0 | Add To Row 1 | Add To Row 2 | Add To Row 3 |
| 0 lines | 0 | 0 | 0 | 0 |
| 1 lines | 1 | 0 | 0 | 0 |
| 2 lines | 1 | 1 | 0 | 0 |
| 3 lines | 1 | 1 | 1 | 0 |

TABLE 3

| Pixel nos. retrieved from each column of memory circuits in a given row as a function of X0, X1 | | | | |
|---|---|---|---|---|
| X0, X1 | Col 0 | Col 1 | Col 2 | Col 3 |
| 0, 0 | 0 | 1 | 2 | 3 |
| 0, 1 | 4 | 1 | 2 | 3 |
| 1, 0 | 4 | 5 | 2 | 3 |
| 1, 1 | 4 | 5 | 6 | 3 |

More particularly, Table 1 shows the alteration of a horizontal addresses in each column to locate a 16-pixel group with a single pixel resolution. The alteration of the column address is controlled by the least significant bits X0 an X1 which are used to specify the pixel distance that the array is moved.

As shown in Table 1, if the incremental movement is zero (the least significant bits X1 and X0 are both zero), then the address contained in the eight most significant bits (X2–X9) is used to directly access each column of the memory array. Alternatively, if bit X0 is a one and bit X1 is a zero indicating a move to the right of the array by one pixel, then the address provided to the first column of memory circuits is increased by one while the remaining columns utilize the most significant bits X2–X9 as the read address. Similar address modifications are made to the column addresses for two and three pixel movements.

The effect of adding the least significant bits to the most significant bits of the address is shown in Table 3. This table illustrates the pixel number of pixels at the start of a video line which are retrieved from the first array row in response to different combinations of bits X0 and X1. As can be seen in Table 3, the array is effectively shifted to the right by one pixel in each case, although the output pixel "order" is different with each array move. A change in output pixel order is accommodated by providing the least significant bits X0 and X1 to the following filter/interpolator stage as will hereinafter be explained causing that stage to properly interpret the output pixels to perform the desired interpolation and filtering functions.

Figure 11:
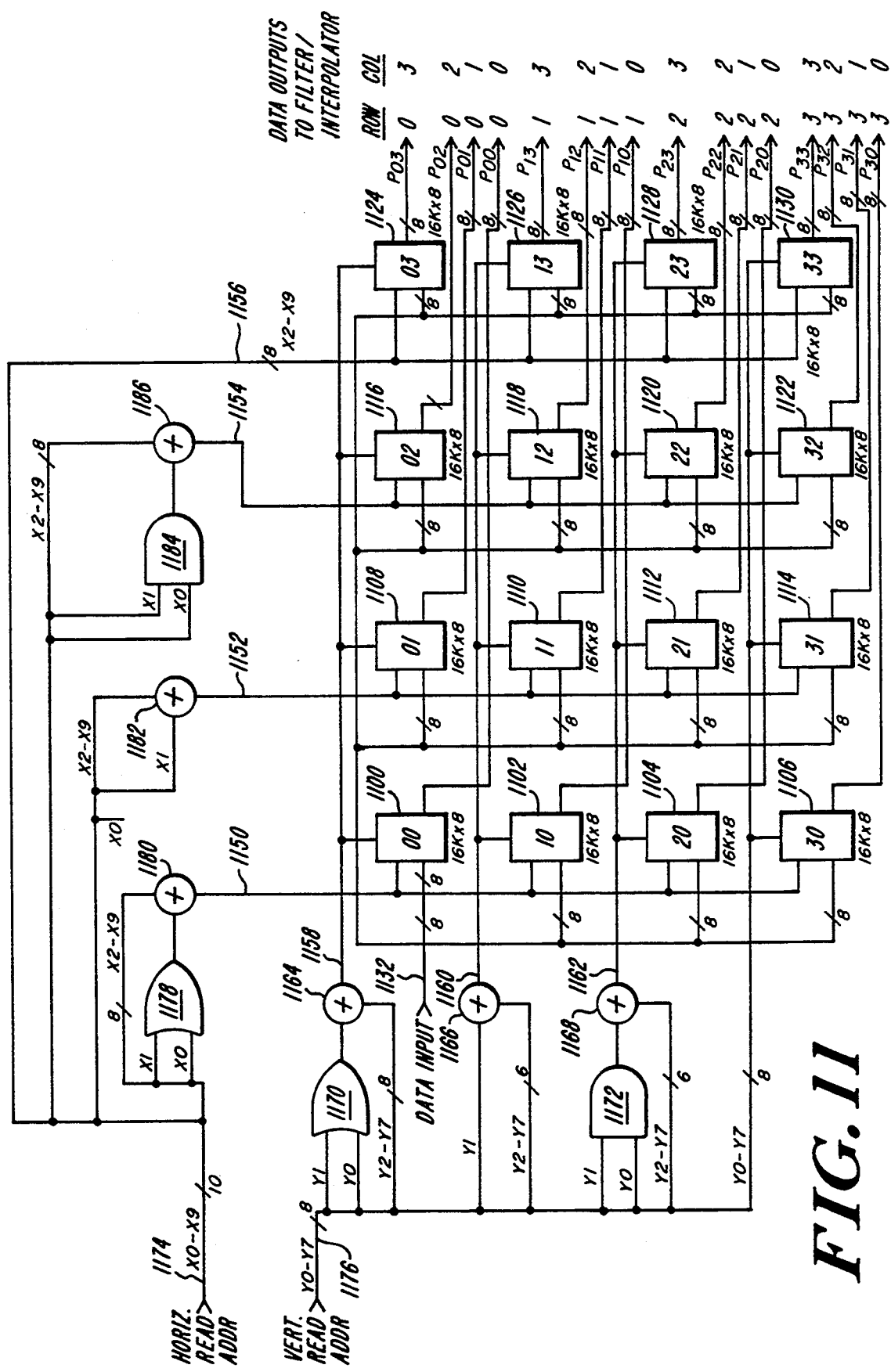
FIG. 11 is an electrical block schematic diagram of the read/write address circuitry for the field memory buffer of FIG. 9.

The addition of least significant bits to the address most significant bits, as shown in Tables 1 and 2, is accomplished by means of the logic circuitry shown in FIG. 11. In particular, the 10 horizontal read address bits (X0–X9) on bus 1174 are provided, via buses 1150–1156, to the four columns of the four-by-four memory circuit array comprised of memory circuits 1100–1130. In particular, the first column of the memory array, consisting of memory devices 1100–1106, is driven by bus 1150 which is, in turn, driven by the output of digital adder 1180. Adder 1180 is provided with two inputs: the eight most significant bits of the horizontal read address (bits X2–X9) and the output of ORgate 1178. ORgate 1178 receives as its inputs the least significant bits X0 and X1. Consequently, the address of the first column of memory circuits will be increased by one if either or both of bits X0 and X1 are "ones".

Similarly, the address on address bus 1152, which provides the horizontal address to the second column of memory devices 1108–1114, is generated by the output of adder circuit 1182 which adds the bit X1 to the most significant bits X2–X9. Consequently, the second column address will be increased by one if bit X1 is a "one".

The address on address bus 1154, which drives memory devices 1116–1122 is generated by the output of adder 1186 which, in turn, receives the most significant bits X2–X9 as one input and adds them to the output of AND gate 1184 which receives, in turn, as inputs the least significant bits X0 and X1. Consequently, the third column address will be increased by one if both bits X0 and X1 are "one".

Finally, the most significant bits X2–X9 are provided directly as an address to the fourth memory column consisting of devices 1124–1130.

In a similar manner, the vertical read addresses on bus 1176 are provided to the four rows of the pixel memory array. In particular, the first row of memory devices (consisting of devices 1100, 1108, 1116 and 1124) is driven by six-bit memory bus 1158 generated by digital adder 1164 which adds the most significant six bits (Y2–Y7) of the vertical read address to the output of ORgate 1170 which is driven by the least significant bits Y0 and Y1.

The next row of memory devices is driven by address bus 1160, which is, in turn, generated by the output of digital adder 1166. Adder 1166 receives, as one input, the most significant six bits of the Y address (Y2–Y7) and as the other input, the least significant bit Y1. The third row of memory devices (consisting of devices 1104, 1112, 1120, 1128) are driven by address bus 1162 which is, in turn, generated by the output of digital adder 1168. As with the X address buses, this latter adder receives the upper six bits of the Y address (bits Y2–Y7). The other input of adder 1168 is the output of AND gate 1172 which receives as its input the least significant bits Y0 and Y1. As with the X addresses, the six Y address bits Y2–Y7 are provided through the last memory device row (consisting of devices 1106, 1114, 1122 and 1130). The outputs of the memory array are 16 pixel values ($P_{00}$–$P_{33}$) which are forwarded to a pixel interpolator to generate the final target pixel value.

Figure 12:
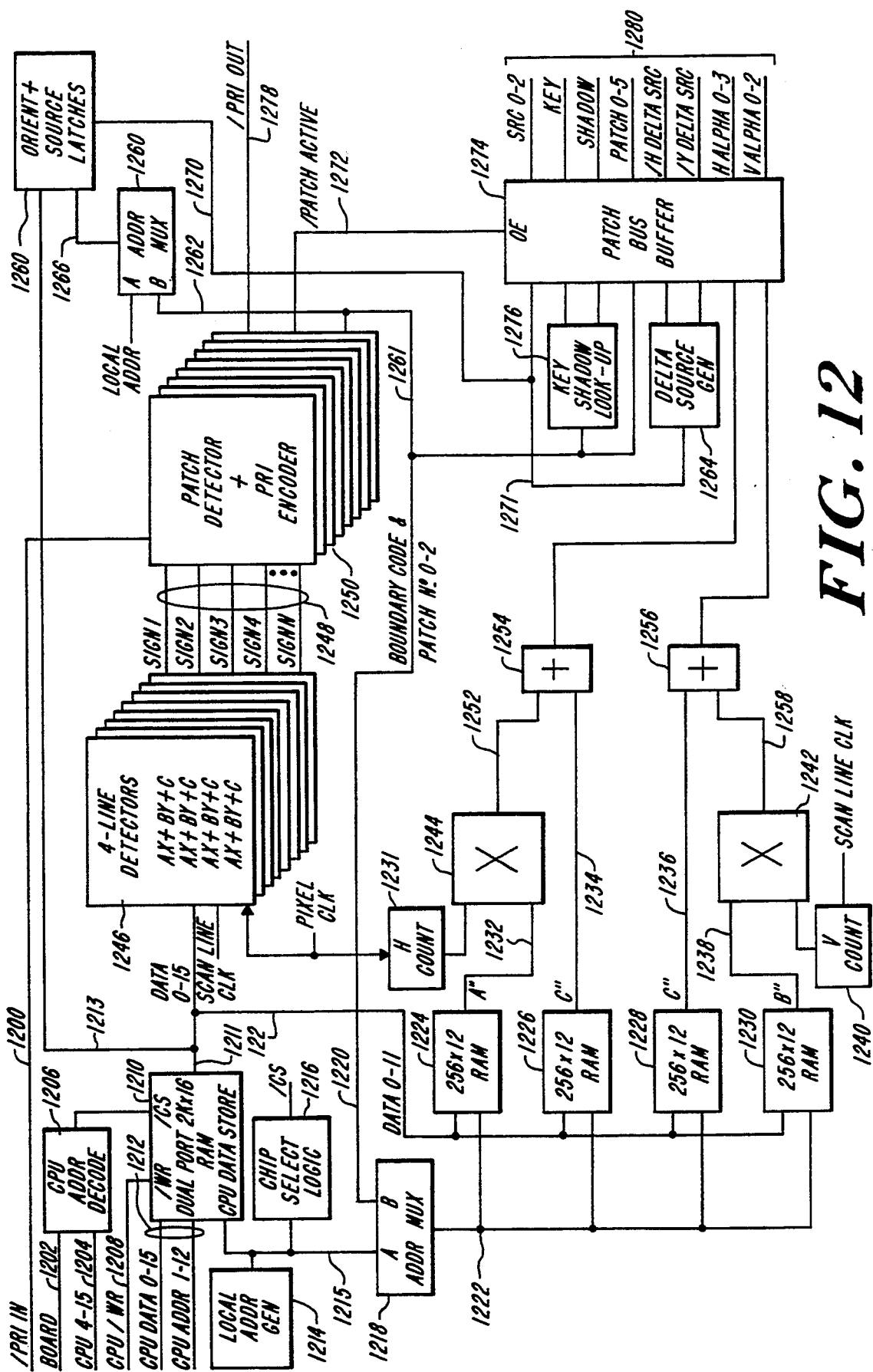
FIG. 12 is an electrical schematic block diagram of a patch detector circuit.

The horizontal and vertical read addresses which retrieve stored source pixel information are generated by the patch detector and manipulator circuits. The schematic block diagram of FIG. 12 illustrates an illustrative embodiment of the circuitry which performs the patch detection process. As previously mentioned, during each video field time, coefficients are calculated which determine the boundary lines of each patch. The coefficient data is stored and used in the patch detection process which takes place during the next video field time. More particularly, the coefficient data which specifies the boundaries for each of the patches used in the system is received via system bus 1212 from the system computer and manager (illustrated in FIG. 4) and is stored in dual-port RAM memory 1210 for later use. RAM 1210 is enabled by address decoding circuit 1206 which responds to board number and CPU select control signals on system control buses 1202 and 1204, respectively. Writing is controlled by the write enable signal CPU/Wr on lead 1208.

During each video field blanking interval, data stored in RAM 1210 during the previous video field interval is retrieved and latched into each of a plurality of patch boundary detectors 1246. In addition, the 12 least significant bits (0–11) of the coefficient values are provided via bus 1221 to line coefficient stores 1224–1230. This latter information will be used (as will hereinafter be described) to generate fractional boundary information when the target pixel location crosses a patch boundary.

The patch data is read out of RAM 1210 on output buses 1211 and 1221 and into detectors 1246 and stores 1224–1230 sequentially under control of sequential address signals generated by local address generator 1214. The address signals produced by generator 1214 are provided to the address inputs of RAM memory 1210 via bus 1215 and are also provided to RAM stores 1224–1230 via address multiplexer 1218 and bus 1222. A chip select logic circuit 1216 decodes the address signals on bus 1215 and generates a chip select signal, /Cs, which is applied to memory 1210 to enable it.

A patch boundary detector circuit 1246 is provided for each patch used in the system. Illustratively, there may be 32 to 64 patches used in the system. Each of the boundary detectors 1246 is a hardware computation circuit which simultaneously evaluates four expressions of the form:

$$Ax_t + By_t + C \qquad (7)$$

where, A, B, C are patch boundary coefficients retrieved from RAM memory 1210 for one selected patch, and $x_t$ and $y_t$ are horizontal pixel numbers ($0 \leq x_t \leq 909$) and vertical scan line numbers ($0 \leq Y_t \leq 263$), respectively, which specify the target pixel location in the output display. The four expressions must be re-evaluated within each pixel time (approximately 70 ns.) but this is not a problem since the circuits are comprised of hardware multipliers and adders.

Figure 18:
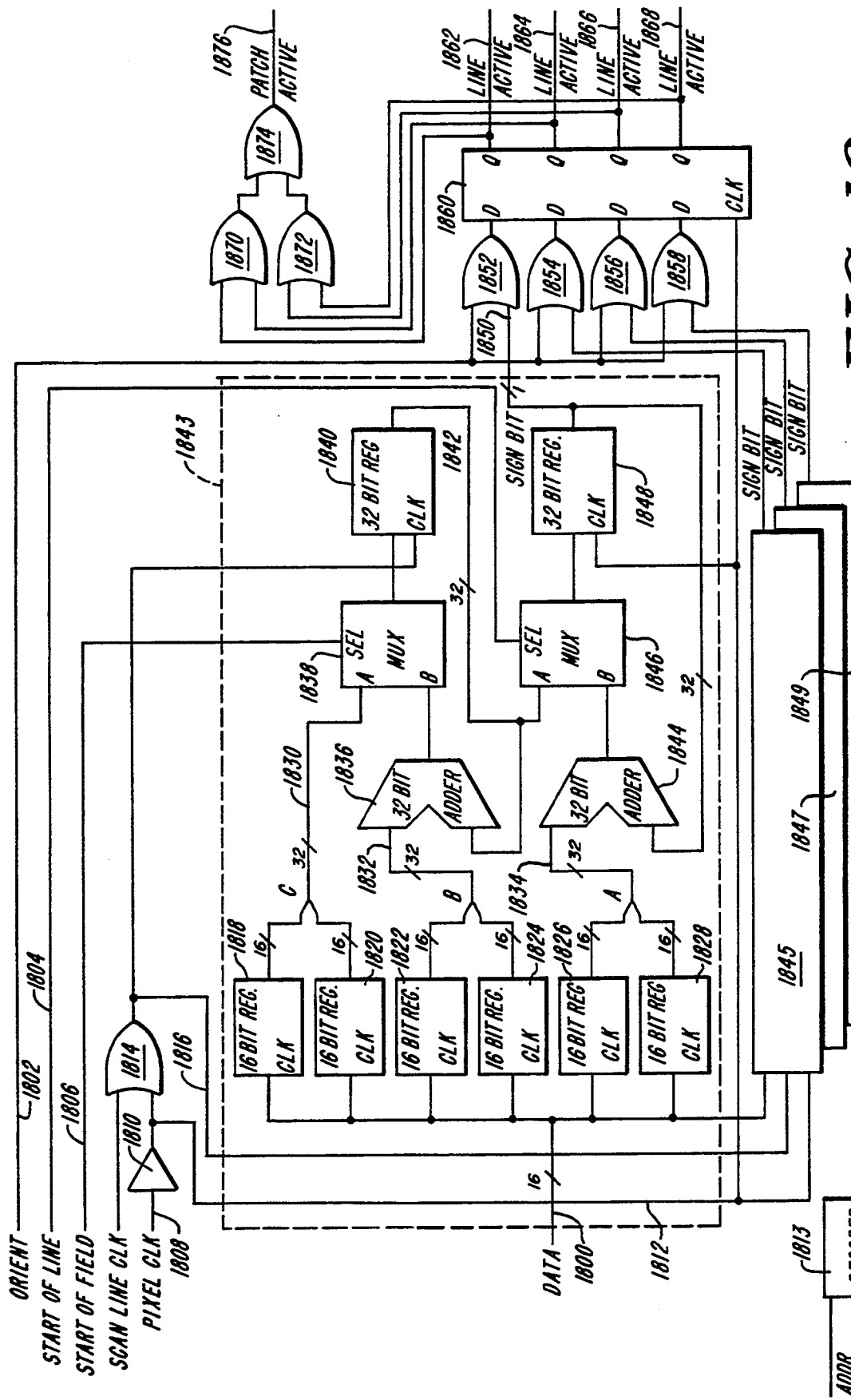
FIG. 18 is a detailed electrical block schematic diagram of a patch boundary line detector.

FIG. 18 shows a more detailed block diagram of a patch boundary detector circuit. The boundary detector circuit actually consists of a plurality of boundary detector circuits, each of which evaluates expression (7) for one patch boundary. As mentioned previously, illustratively, each patch is allowed up to four boundaries. FIG. 18 shows the four boundary detector circuits, 1843–1849, illustratively associated with one patch. As each of the four boundary detectors is identical, for clarity, only boundary detector 1843 is shown in detail.

Detector 1843 receives coefficient data over 16-bit data bus 1800 from the system computer as previously described. This data is latched into a plurality of registers 1818–1828 which store the information for a field interval until the information is needed during the next subsequent field interval. Storage of the data in registers 1818–1828 is under control of a decoder circuit 1813 which receives address information from the system address bus and control information (including a chip select signal, /Cs, and a write signal, /Wr). Under control of the system control signals, decoder chip 1813 generates twenty-four chip select signals, Cs0–/Cs23. The chip select signals are applied to registers 1818–1828 to enable them at the proper time to receive information from bus 1800. Each of the coefficients (A, B, and C) for the patch boundary is comprised of a 32-bit number and, thus, the information must be transferred in two portions over 16-bit data bus 1800 and latched into the appropriate registers. Registers 1818 and 1820 store the information for coefficient C whereas registers 1822 and 1824 store coefficient B information. Finally, registers 1826 and 1828 store the coefficient A information.

The output of registers 1818 and 1820 (comprising the 32-bit coefficient C information) is provided, via bus 1830, to the A-input of data multiplexer 1838. This multiplexer is controlled by a "start of field" signal so that at the beginning of each video field, multiplexer 1838 is controlled to apply the C coefficient information to a 32-bit register 1840. The start of field, scan line clock (which operates at the scan line rate) and start of line timing signals are derived from reference video information by the output video processor circuitry as will be hereinafter described. The C coefficient information is clocked into register 1840 under control of a scan line clock signal which is provided, via OR gate 1814, of the clock input of register 1840.

Output 1842 of 32-bit register 1840 is provided to one input of 32-bit adder 1836. The other input of adder 1836 receives the B coefficient information on bus 1832 from registers 1822 and 1824. The sum of the output of register 1840 and the B coefficient on bus 1832 is applied to the B input of multiplexer 1838. Immediately after the start of a video field, the start of field signal on lead 1806 becomes low, causing the B input of multiplexer 1838 to be connected to register 1840. Since register 1840 is clocked at the start of each scan line by the scan line clock, as the target pixel line position ($y_t$) increases with each scan line, the B coefficient information is added to the sum in register 1840 producing the expression $By_t + C$ which appears at the output of register 1840.

The sum $By_t + C$ is applied, via bus 1842, to the upper input of multiplexer 1846. At the beginning of each scan line, the sum $By_t + C$ is clocked into 32-bit register 1848 through multiplexer 1846. Register 1848 is, in turn, connected to one input of 32-bit adder 1844 which receives the A coefficient information from registers 1826 and 1828, via bus 1834. Register 1848 is clocked by the pixel clock, via lead 1812 and buffer amplifier 1810. Thus, as the target pixel position ($x_t$) advances, the coefficient A is repeatedly added to the initial sum $By_t + C$ producing the final expression $Ax_t + By_t + C$ in register 1848.

The sign bit of register 1848 appears on lead 1850 and is used to indicate whether the target pixel position ($x_t$, $y_t$) is either to the right of the patch boundary (expression (7) is negative), to the left of the boundary (expression (7) is positive), or on the boundary (expression (7) is zero). In the case where expression (7) is positive or zero the sign bit will be zero; when expression (7) is negative the sign bit will be "one". The sign bit is provided to one input of exclusive or gate 1852. A similar sign bit is developed by circuits 1845–1849 and applied to exclusive-OR gates 1854–1858, respectively.

Each of exclusive-OR gates 1852–1858 receive the Orient signal at their other input, via lead 1802. As previously mentioned, if a patch has been "flipped over" during manipulations its orientation will be clockwise causing expression (7) for each boundary to be negative even though the target pixel is within the patch. If this type of patch manipulation occurs, the system computer applies a "high" signal to the orientation lead 1802 which inverts the sign bits so that the condition in which the scan point is within a patch is always indicated by all "zero" sign bits. The outputs of exclusive-OR gates 1852–1858 are applied to a latch circuit 1860 which is clocked by the pixel clock. The outputs of latch circuit 1860 are four leads 1862–1868 carrying the /line active signals. Thus, the condition where the target point is within a patch is indicated by all of the line active signals 1862–1868 being "low". The signals on leads 1862–1868 are provided to OR gates 1872–1874 to produce the /patch active signal 1876 which is "low" if the target pixel ($x_t$, $y_t$) falls within the patch.

Returning to FIG. 12 the /line active signals of the four evaluated results are provided, via leads 1248, to one of patch detector and priority decoder circuits 1250. A patch detector and priority decoder circuit is provided for each boundary detector circuit.

Each patch detector and priority decoder circuit compares the four /line active signals generated by the boundary detector circuit on leads 1248. If all signs are "zero", then the target pixel location ($x_t, y_t$) is within the boundaries of the patch being evaluated by the corresponding boundary detector. Each of the patch detector circuits is assigned a unique patch number. Consequently, the patch detector which detects that the target pixel is within the corresponding patch boundaries generates the corresponding patch number on output lead 1261 which is connected in parallel to each of detectors 1250.

As previously mentioned, it is possible that the target pixel can be located within more than one patch. Since only one patch can be visible at a target pixel location $x_t, y_t$, the patch number of the "visible" patch is determined by a "depth" or priority value (/Pri in) furnished to detectors 1250 by the system computer over bus 1200. Each patch detector is preassigned a priority value which is compared to the priority value generated by the system computer. Patch detectors associated with patches that lie "behind" the "visible" patch (and, therefore, have a "lower" assigned priority value than the system generated priority value) are disabled so that only one patch detector produces a patch number for each target pixel location.

Figure 19:
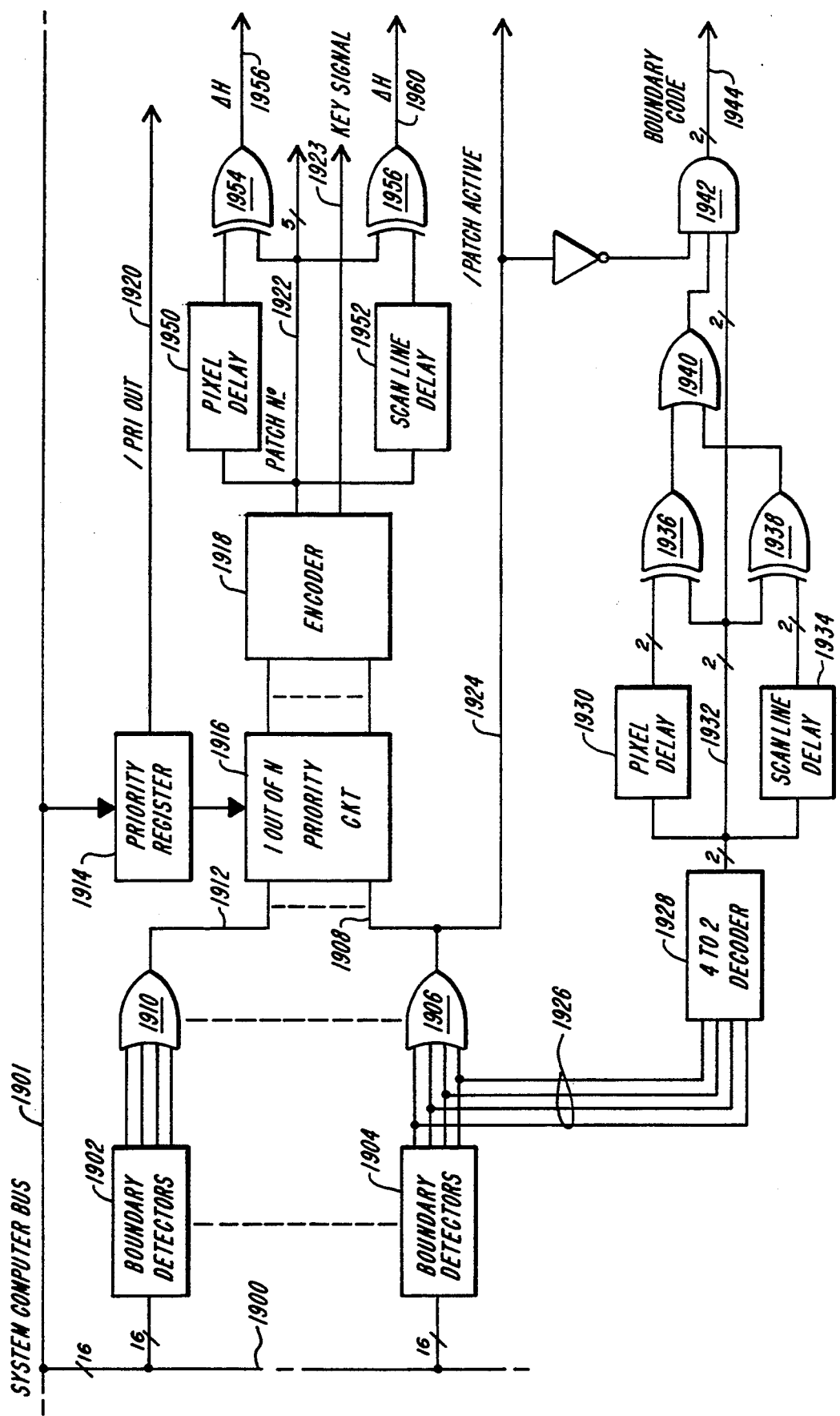
FIG. 19 is a detailed electrical block schematic diagram of the patch detector and priority circuit.

FIG. 19 shows a more detailed block diagram of the patch detector and priority circuit. This circuit detects when a patch is active and, if there is more than one patch active, selects the patch with the highest priority. In particular, the circuit is controlled by signals on system computer bus 1901. As previously mentioned, these signals are provided to the boundary detectors 1902–1904, one of which is provided for each patch. As the circuitry for each patch detector is identical, only one patch detector will be described in detail.

The four /line active signals generated by each boundary detector (previously described in connection with FIG. 18) are provided to an OR gate 1906 which produces a "low" signal if all /line active signals are "low" indicating that the target pixel is included in the corresponding patch (gate 1906 corresponds to gates 1870–1874 in FIG. 18. It is duplicated here for clarity).

The "low" signal on gate output 1908 (corresponding to the /patch active signal) is applied to a 1 out of N priority circuit 1916 (where "N" is the total number of patches, illustratively 64). Priority circuit 1916 is controlled by a priority register 1914 which is, in turn, loaded with priority information (signal /Pri in) from the system computer bus 1901. The priority information stored in register 1914 (/Pri out) is provided to the remainder of the circuit via bus 1920. In addition, the priority information in register 1914 controls circuit 1916 to select the highest priority /patch active signal out of all the patches which produce a /patch active signal. This signal appears on one of the N leads supplied to an encoder 1918 which encodes the patch number into a binary coded /Patch # signal on bus 1922. If no patches are active, encoder generates a single-bit key signal on lead 1923. This key signal is later used to combine the video signal with another "background" signal.

In FIG. 12, the patch number and the key signal on bus 1261 (corresponds to buses 1922 and 1923 in FIG. 19) is provided to key and shadow look-up circuit 1276, patch bus buffer 1274, address multiplexer 1218 (via bus 1220) and address multiplexer 1260 (via bus 1262).

In response, key and shadow look-up circuit 1276 generates a "shadow" signal when a patch (or group of patches) is designated as a "shadow" patch. The shadow signal is also provided to patch bus buffer 1274. The key signal is passed through buffer 1274 to the /Key output.

In addition to the patch coefficient information, codes indicating the video source and patch orientation are retrieved from RAM 1210 on bus 1213 during each video field. As previously mentioned, the incoming video stream can be composed of one of three video sources which is selected by the input video processor. The identity of the selected source must be provided to the edge interpolation circuits (described in detail below) so that an acceptable image transition can be generated at picture boundaries. Consequently, the code indicating the video source is latched into orient and source latches 1268 under control of the local address generated by address generator 1214 as the coefficient data is being read out of RAM 1210. Also, in order to provide for proper edge interpolation, the "orientation" of each patch is determined by the system computer since it is possible that one or more of the patches may have been "flipped over" during 3D patch manipulations. The orientation information is also retrieved from RAM memory 1210 and stored in latches 1268 under control of the local address information. After the target pixel has been located in a patch the orientation of that patch and the video source information is provided to patch bus buffer 1274 via bus 1270.

As long as each target pixel is within the boundaries of a patch, the vertical and horizontal positions of the pixel need only be computed with single pixel resolution to provide for subsequent interpolation. However, when the boundary of any patch is crossed (a given pixel is within the patch, but the next subsequent pixel is outside the patch) in either horizontal or vertical direction, as indicated by a patch changing from active to inactive, it is necessary to determine the position of that boundary with a precision greater than a single pixel spacing so that subsequent pixel value edge interpolations will be acceptably accurate.

Consequently, as shown in FIG. 19, circuitry is provided to determine the direction of the movement and to identify the boundary that is crossed. To determine the direction of movement (vertical and/or horizontal), the present patch number is compared to the previous patch numbers one scan line earlier and one pixel earlier.

In particular, the current patch number on bus 1922 is applied to a pixel delay circuit 1950 and a scan line delay circuit 1952. These latter circuits generate the required previous patch numbers. The previous patch numbers are exclusive Ored with the current patch number by exclusive OR gates 1954 and 1956. Thus a movement in the horizontal direction causes gate 1954 to generate a "high" on output lead 1958, while a movement in the vertical direction causes gate 1956 to generate a "high" on output lead 1960. These signals are used to control an edge interpolator which processes the signal at a later stage as will be described in detail below.

The identity of the boundary line which has been crossed is determined by comparing the status of the /line active signals in the active patch to their status one scan line earlier and one pixel earlier. More specifically, the four /line active signals on leads 1926 are applied to a four-to-two encoder 1928 which encodes the signals as a two-bit binary signal. The two-bit binary signals are applied to a pixel delay 1930 and a scan line delay 1934. Pixel delay 1930 delays the two-bit code by a time delay equal to one pixel duration.

Alternatively, scan line delay 1934 delays the two-bit code by a time duration equal to one scan line. The delayed output of pixel delay 1930 is applied to exclusive OR circuit 1936 which exclusive ORs the output with the two-bit code generated by encoder 1928 on lead 1932. In a similar manner. the output of scan line delay 1934 is applied to exclusive OR circuit 1938 and exclusive ORed with the output encoder 1928 on lead 1932. Thus, when the boundary detector indicates that a boundary has been crossed in a horizontal direction, the inputs to exclusive OR gate 1936, which represent the current boundary status and the boundary status one pixel time earlier, will be different causing gate 1936 to produce a high output. In a similar manner, if the state of the boundary detector changes relative to its scan line earlier, gate 1938 will produce a high output. In either case, the high outputs are ORed together by OR gate 1940 and applied to AND gate 1942 allowing the boundary code generated by encoder 1928 to pass through gate 1942 and appear as the boundary code output 1944.

The combination of boundary code and the active patch number is then used to address a memory in which all boundary line parameters have been stored for the duration of one video field's time. Specifically, referring to FIG. 12, the boundary coefficients which represent the identified boundary line are retrieved from RAM stores 1224–1230. In particular, the three least significant bits (bits 0–2) of the patch number and the boundary code on bus 1261 generated by patch detector circuits 1250 are provided, via bus 1220, to address multiplexer 1218. Under control of control circuitry (not shown), multiplexer 1218 applies the patch number bits as an address to RAM memories 1224–1230 over bus 1222 to retrieve four coefficients, (A", C", C' and B') on buses 1232–1238, respectively.

The coefficient A" on bus 1232 is multiplied by the pixel horizontal position. The horizontal pixel values and vertical scan line numerical values are sequentially generated from local counters 1231 and 1240, respectively. Counter 1231 is clocked by the system pixel clock and reset by the scan line reset signal. Counter 1240 is clocked by the system scan line clock and reset by the field rate signal. The horizontal pixel value is multiplied by the coefficient A" by hardware multiplier 1244. The product A"$x_t$ on bus 1252 is added to the coefficient C" by adder 1254. Consequently, for a boundary crossing in the vertical direction, an expression:

$$y'' = A''x_t + C' \qquad (8)$$

is evaluated which generates a fractional value, y", of the vertical position $y_t$ which is provided to the patch bus buffer 1274 and subsequently sent to a vertical direction edge interpolator which follows in the system.

The coefficient B' on bus 1238 is multiplied by the pixel vertical position (value $y_t$ generated by counter 1240) by hardware multiplier 1242. The product B'$y_t$ on bus 1258 is added to the coefficient C' by adder 1256. Consequently, for a boundary crossing in the horizontal direction, an expression:

$$X' = B'y_t + C' \qquad (9)$$

is evaluated which generates the fractional value, x", of the horizontal position $x_t$ which is provided to patch bus buffer 1274 and subsequently sent to a horizontal direction edge interpolator which follows in the system.

For simultaneous crossings in both vertical and horizontal directions, both fractional values y" and x" are sent simultaneously to the respective interpolators.

In the case of boundary crossing, it is also necessary more carefully specify the video source at the boundary. In this case, the source information stored in orientation and source latches 1268 is provided to Delta Source Generator 1264 via bus 1270 and bus 1271. Delta Source Generator determines the exact video source identity at the patch boundary and generates two output signals (/H Delta Src, /V Delta Src) which are provided to patch bus buffer 1274.

The outputs 1280 of patch bus buffer 1274 consisting of video source code (Src), the key signal (/Key), the shadow signal (/Shadow), the patch number (/Patch), the delta source signals (/H Delta Src, /V Delta Src) and the fractional boundary numbers (H alpha and V alpha) are stored in the buffer and transferred to the following circuits when a patch has been detected.

Figure 13:
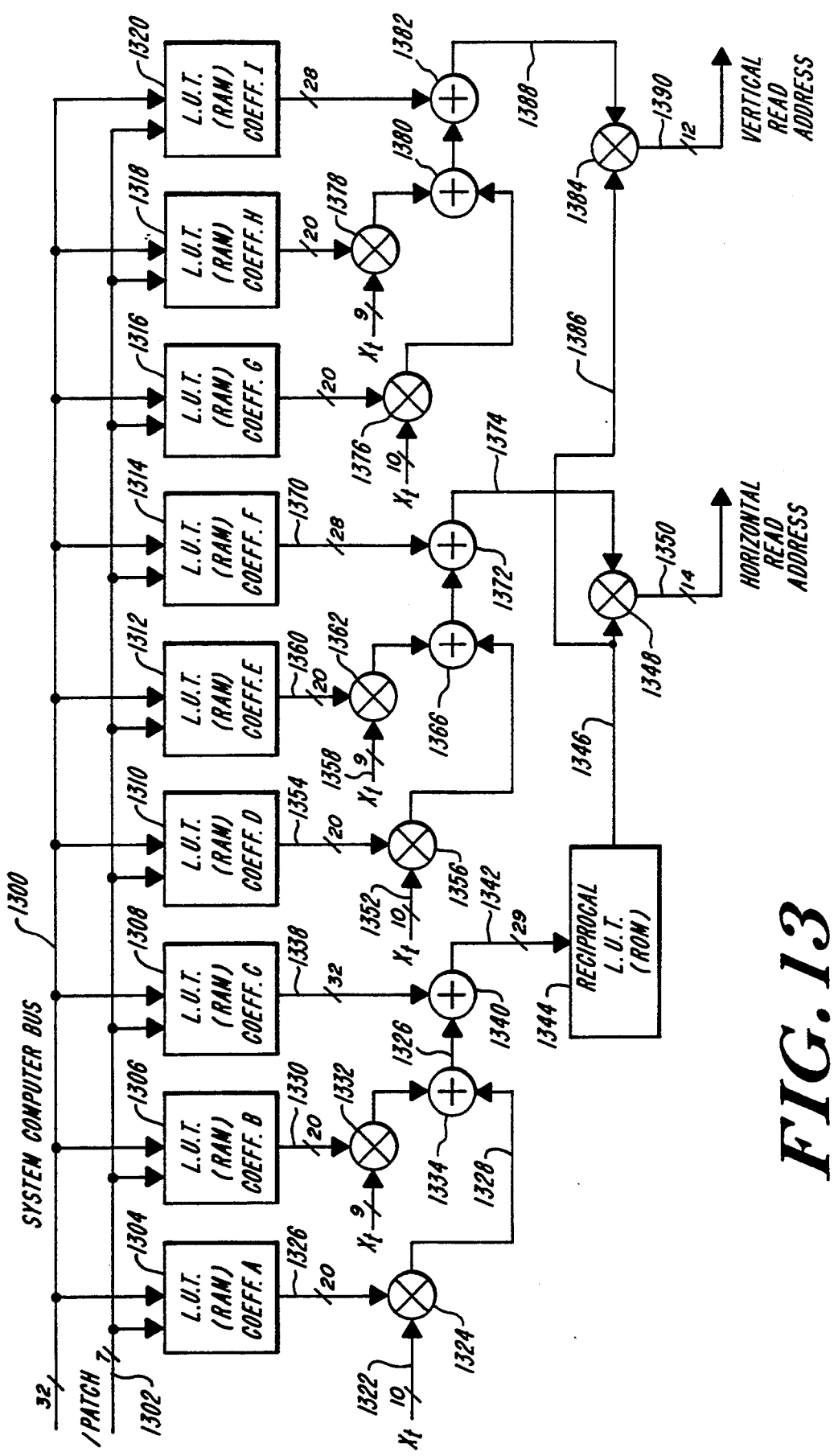
FIG. 13 is an electrical block schematic diagram of a manipulator circuit.

In particular, the patch number (/Patch) is forwarded to the manipulator circuit shown in more detail in FIG. 13. The function of the manipulator circuit is to generate a memory read address which is used to retrieve a 16 pixel array from the video field buffer memory previously described and shown in FIGS. 8–11. The read address is generated by separately generating a horizontal read address and a vertical read address. The horizontal read address and the vertical read address are then combined to generate the final read address. The horizontal read address and the vertical read address are, in turn, generated by evaluating expressions of the form:

$$\text{Horizontal Address} = \frac{D_n x_t + E_n y_t + F_n}{A_n x_t + B_n y_t + C_n} \qquad (10)$$

$$\text{Veritcal Address} = \frac{G_n x_t + H_n y_t + I_n}{A_n x_t + B_n y_t = C_n} \qquad (11)$$

where $x_t$, $y_t$ are the target pixel horizontal and vertical position numbers generated by counters 1231 and 1240 (FIG. 12), respectively and $A_n$, $B_n$, $C_n$, $D_n$, $E_n$, $F_n$, $G_n$, $H_n$, $I_n$ are inverse coefficients for the nth patch number. As previously mentioned, the coefficients $A_n$–$I_n$ are obtained by inverting the transformation matrices which determine the patch 3D transformations and their values depend upon the patch size, translation, rotation and perspective which have been requested via the user control panel. However, since each of the patches is flat, the inversions are not multiple-order and can be performed in real time by the system computer during the previous video field time.

More particularly, at the start of each video field interval, look-up-table RAMS (L.U.T RAMs) 1304–1320 are each ($A_t$–$A_n$ are loaded into RAM 1304; $B_t$–$B_n$ are loaded over system bus 1300 with a set of coefficients into RAM 1306, etc.) for each of the n patches being processed in the System. Illustratively, for a 32 patch system, 288 coefficients would be loaded into RAMS 1304–1318.

Each of RAMs 1304–1320 then serves as a look-up table which receives the /Patch number signal from the patch detector circuit (FIG. 12) from bus 1302 as an input address in order to retrieve the coefficient corresponding to the detected patch number. The nine coefficients ($A_n$, $B_n$, $C_n$, $D_n$, $E_n$, $F_n$, $G_n$, $H_n$, $I_n$) retrieved from RAM memories 1304–1320 are then loaded into various multipliers and adders to compute the horizontal and vertical read addresses.

More particularly, the denominator of the horizontal and vertical read address expressions is generated by multipliers 1324 and 1332 and adders 1334 and 1340. The horizontal target pixel position number $x_t$ on bus 1322 is provided to hardware multiplier 1324. Multiplier 1324 receives as its other input the 20-bit coefficient ($A_n$) retrieved from look-up table RAM 1304 and provided on bus 1326 to multiplier 1324. The product $A_n x_t$ on bus 1328 is provided to one input of adder 1334. The other input of adder 1334 receives the product $B_n y_t$ developed by multiplier 1332. Multiplier 1332, in turn, receives a nine-bit target pixel vertical position number $y_t$ from counter 1240 (FIG. 12) and a 20-bit coefficient number ($B_n$), via bus 1330, from look-up table RAM 1306. The sum $A_n x_t + B_n y_t$ on bus 1336 is provided to adder 1340 which adds a 32-bit coefficient ($C_n$) on bus 1338 obtained from look-up table RAM 1308.

The output 1342 of adder 1340 is a 29-bit signal $A_n x_t + B_n y_t + C_n$. This number is provided as the address input to a reciprocal look-up table ROM 1344 which generates the reciprocal of the number on bus 1346 and provides it to multipliers 1348 and 1384.

The numerator of the horizontal read address expression is generated by multipliers 1356 and 1362 and adders 1366 and 1372 in conjunction with coefficient values provided from RAMs 1310–1314. More particularly, the target pixel horizontal position number ($x_t$) is provided on bus 1352 to multiplier 1356. Multiplier 1356 also receives a 20-kit coefficient ($D_n$) from look-up table RAM 1310, via bus 1354. The product $D_n x_t$ on bus 1368 is provided to one input of adder 1366. Adder 1366 receives, at its other input 1364, the product developed by multiplier 1362. Multiplier 1362, in turn, receives the target pixel vertical position number ($y_t$) on bus 1358 and a 20-bit $E_n$ coefficient from look-up table RAM 1312, via bus 1360. The expression $D_n x_t + E_n y_t$ developed by adder 1366 is provided to adder 1372 which adds a 28-bit coefficient $F_n$ retrieved from look-up table RAM 1314 and provided, via bus 1370, to adder 1372. The completed numerator expression comprising the computed value $D_n x_t + E_n y_t + F_n$ is provided to the other input of multiplier 1348 which multiplies it by the reciprocal of the denominator expression $A_n x_t + B_n y_t + C_n$ to develop a 14-bit horizontal read address signal on bus 1350.

In a similar manner, the vertical read address signal is generated from look-up table RAMs 1316–1320, multipliers 1376, 1378 and 1384, and adders 1380 and 1382. The numerator expression consisting of the expression $G_n x_t + H_n y_t + I_n$ is developed on bus 1388 and provided to one input of multiplier 1384. The other input of multiplier 1384 receives the reciprocal of the denominator expression $A_n x_t + B_n y_t + C_n$ on bus 1386 and develops a 12-bit vertical read address on bus 1390.

The ten most-significant bits of the horizontal read address and the eight most-significant bits of the vertical read address are provided to the video field memory. As previously mentioned these latter addresses are used to retrieve a 16-pixel array which is then used to generate the output or target pixel by means of interpolation of the 16 pixel values. The four least significant bits of the horizontal read address and the four least significant bits of the vertical read address are provided to the filter and interpolator circuits as fractional address values which are used to set the filter coefficients as will hereinafter be discussed.

More particularly, the 16 pixels retrieved from the video field buffer memory are transmitted to a 4×4 interpolator/filter which computes a weighted average of the 16 pixels to generate the value for a single target pixel located near the center of the 16-pixel array.

The formula used for the weighted average is:

$$P_t = (h_0 P_{00} + h_1 P_{01} + h_2 P_{02} + h_3 P_{03}) v_0 + \quad (12)$$
$$(h_0 P_{10} + h_1 P_{11} + h_2 P_{12} + h_3 P_{13}) v_1 +$$
$$(h_0 P_{20} + h_1 P_{21} + h_2 P_{22} + h_3 P_{23}) v_2 +$$
$$(h_0 P_{30} + h_1 P_{31} + h_2 P_{32} + h_3 P_{33}) v_3$$

where the coefficients $h_0$–$h_3$ impose the desired degree of horizontal filtering and fractional pixel displacement on the target pixel and the the coefficients $v_0$–$v_3$ impose the desired degree of vertical filtering and fractional pixel displacement on the target pixel. The values of coefficients $h_0$–$h_3$ and $v_0$–$v_3$ are influenced by the:

a) the fractional portion of horizontal and vertical read addresses (four least significant bits of the horizontal read address and the four least significant bits of the vertical read address generated by the manipulator circuit;

b) the single pixel distance (0–3) that the 16 pixel array has been moved as determined by the values of horizontal read address bits X0 and X1 and vertical read address bits Y0 and Y1 which modify the read addresses in the field buffer memory and cause the outputs to be permutated; and, c) the horizontal and vertical filter bandwidth requirements.

The required horizontal and vertical filter bandwidths are determined by computing the difference between the current memory read address and the read address which was used for retrieval of the previous pixel. The difference between the current memory read address and the read address which used for retrieval of the corresponding pixel one scan line earlier is also computed. The computed differences are then compared to a set of threshold values and the largest difference is used to determine a set of filter coefficients (the larger the computed difference, the narrower the required filter bandwidth).

More particularly, the filter code calculation circuit (calcode circuit) is shown in more detail in FIGS. 14A, and 14B. A code word, determined empirically, is derived from the measured difference comparisons. This filter code (one for horizontal and one for vertical) is then used to vary the filter coefficients to produce the required bandwidth.

The calcode circuit illustrated in FIGS. 14A and 14B consists of two substantially similar circuits. Circuit 1400 receives the 10 most-significant bits of the horizontal read address on input bus 1404 and generates a horizontal filter code on output bus 1430, which code is subsequently used to select a set of horizontal filter coefficients that perform the filtering operation with the required bandwidth.

Circuit 1402 receives the eight most-significant bits of the vertical read address on input bus 1432 and generates a vertical filter code on output bus 1434. Since circuits 1400 and 1402 operate in a substantially similar manner, for clarity, only circuit 1400 will be described in detail.

More specifically, the 10 most-significant bits of the horizontal read address on input bus 1404 are provided to a pixel delay circuit 1406 which delays the address for a time period equal to one pixel duration. The delayed address on bus 1407 is provided to one input of subtraction circuit 1410. The other input of subtraction circuit 1410 is the horizontal read address on bus 1408. The difference between these two signals is provided, on bus 1412, to one input of compare circuit 1422.

In a similar manner, the horizontal read address on input bus 1404 is provided to line delay circuit 1414 which delays the address for a time period of one video scan line duration. The delayed address on bus 1417 is provided to one input of subtraction circuit 1418. The other input of subtraction circuit 1418 is the horizontal read address provided on bus 1416. The difference between the two read addresses on output bus 1420 is provided to the other input of compare circuit 1422.

Circuit 1422 compares the two address differences and generates a signal which indicates which of the address differences is larger. The address differences themselves are provided to the select inputs of a selection circuit 1424 which is controlled by the output of compare circuit 1422. Accordingly, the largest address difference on bus 1426 is provided as an address to filter code look-up table 1428. Filter code look-up table consists of a ROM which has been loaded with a plurality of filter code words. The code words are determined empirically to produce the desired filter characteristics with the computed address differences encountered during the normal operation of the circuit. The retrieved filter code is subsequently used to select filter coefficients which will produce the required filter bandwidth.

In a similar manner, the vertical circuit 1402 generates a vertical filter code used to select the vertical filter coefficients to produce the required vertical bandwidth.

The horizontal and vertical filter codes generated by the calcode circuit and the source pixel values are provided to a filter/interpolator circuit which generates the final target pixel value. A more detailed structure of the filter/interpolator shown in FIG. 15. The filter in FIG. 15 processes the luma information for the target pixels. An identical filter processes the chroma information. The interpolator consists of a plurality of interconnected hardware digital multipliers and summers which form the sum of products set forth in expression (12). In particular, the filter/interpolator circuit receives the horizontal filter code generated by the calcode circuit shown in FIGS. 14A and 14B on bus 1500. The X0 and X1 address bits which indicate the modification of the horizontal read address are received from the field memory buffer on bus 1502 and the four fractional address bits on bus 1504 are received from the manipulator circuit. These inputs are combined and applied as addresses to look-up table ROMs 1506–1512 which, in response, generate the horizontal filter coefficients $h_0$–$h_3$. The filter coefficients are then multiplied by the appropriate source pixel values and the results are summed to generate the target or output pixel value.

More specifically, filter coefficient $h_0$, which is retrieved from look-up table ROM 1512, is provided, via bus 1514, to four multipliers, 1516–1521. Multiplier 1516 receives the source pixel value $P_{00}$ on bus 1518 and applies the product $h_0 P_{00}$, via bus 1520, to summer 1522.

Summer 1522 receives, at another input, the product generated by multiplier 1524 on bus 1530. Multiplier 1524 multiplies the source pixel value $P_{01}$ on bus 1526 by the filter coefficient $h_1$ retrieved from look-up table ROM 1510 and provided on bus 1528. The sum $H_0 P_{00} + h_1 P_{01}$ is provided, via bus, 1532 to summer 1538 where it is summed with product $h_2 P_{02}$ generated by multiplier 1536 and product $h_3 P_{03}$ generated by multiplier 1534. The output of summer 1538 is, in turn, applied to multiplier 1540 which receives, as its other input, the filter vertical coefficient $v_0$ generated from look-up table ROM 1562.

Figure 14:
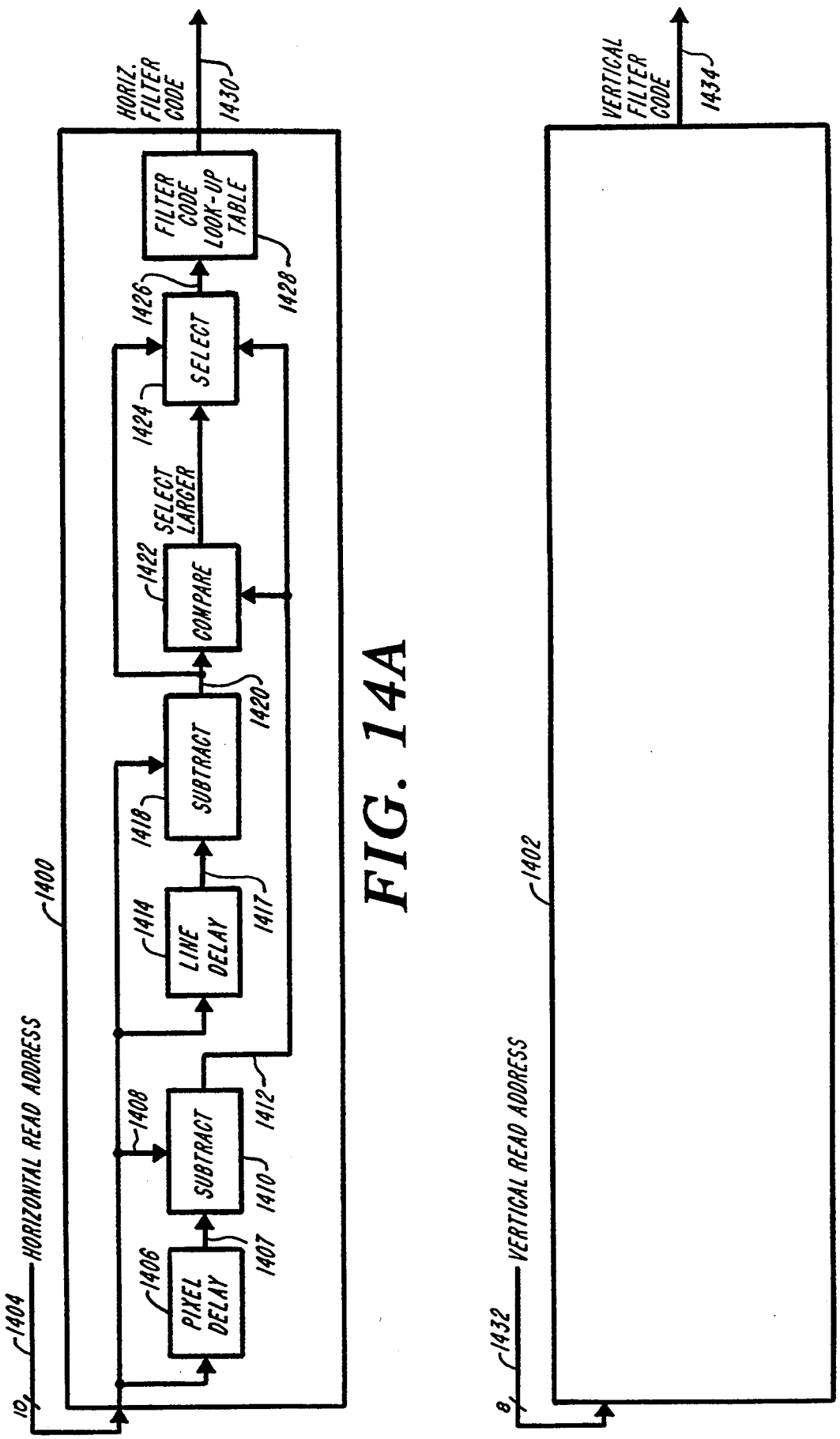
FIG. 14A and 14B together constitute an electrical block schematic diagram of the filter coefficient generator circuit.

The vertical filter coefficients are generated by look-up table ROMs 1562–1556 which receive, as their address inputs, a vertical filter code on bus 1550 generated by the calcode circuit shown in FIG. 14; the Y0 and Y1 address bits from the field buffer memory circuit; and the fractional vertical read address bits from bus 1554 from the manipulator circuit. Filter coefficients $v_0$–$v_3$ retrieved from look-up table ROMs 1562–1556 are applied to multipliers 1540–1545 in order to generate the final subtotals. The outputs of multipliers 1540 and 1541 are summed in summer 1542 and the result on bus 1544 is summed with the products generated by multipliers 1543 and 1545. The final output on bus 1546 comprises the value of the target pixel for the target pixel location $x_t$, $y_t$.

A similar process is carried out for each of the target pixels in the video display field resulting in a stream of output luma pixels on bus 1546. A similar filter/interpolator generates a stream of chroma pixels from the chroma portion of the video field buffer memory.

Figure 16:
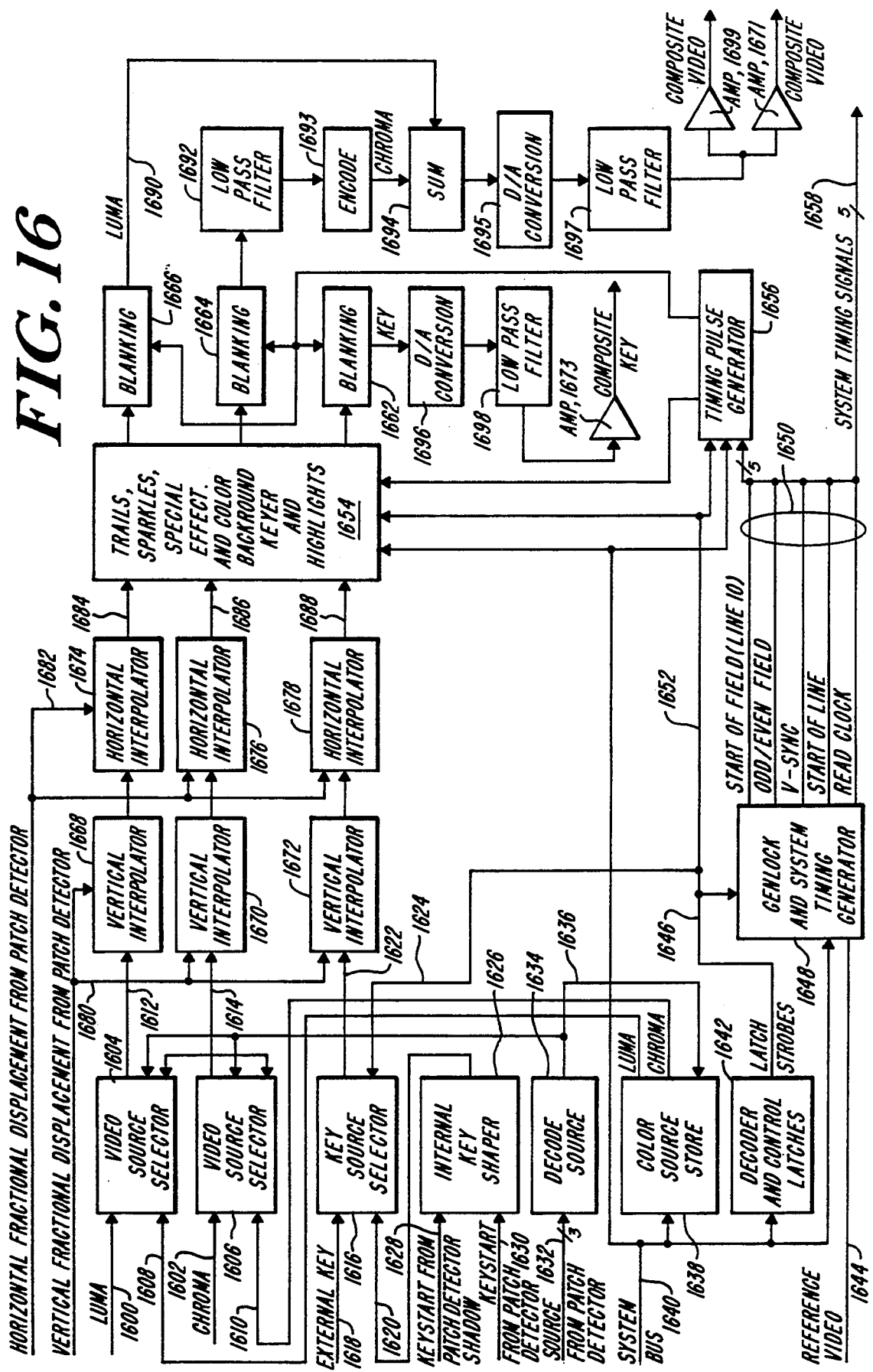
FIG. 16 is an electrical block schematic diagram of an output video processor circuit which processes the transformed digital information to generate output analog video information.

The output luma and chroma pixel streams are applied to output video processor circuitry which further processes the signals, combines the luma and chroma information and finally converts the digitized information into a composite video signal. A functional block diagram of the output video processor circuitry is shown in FIG. 16.

Figure 15:
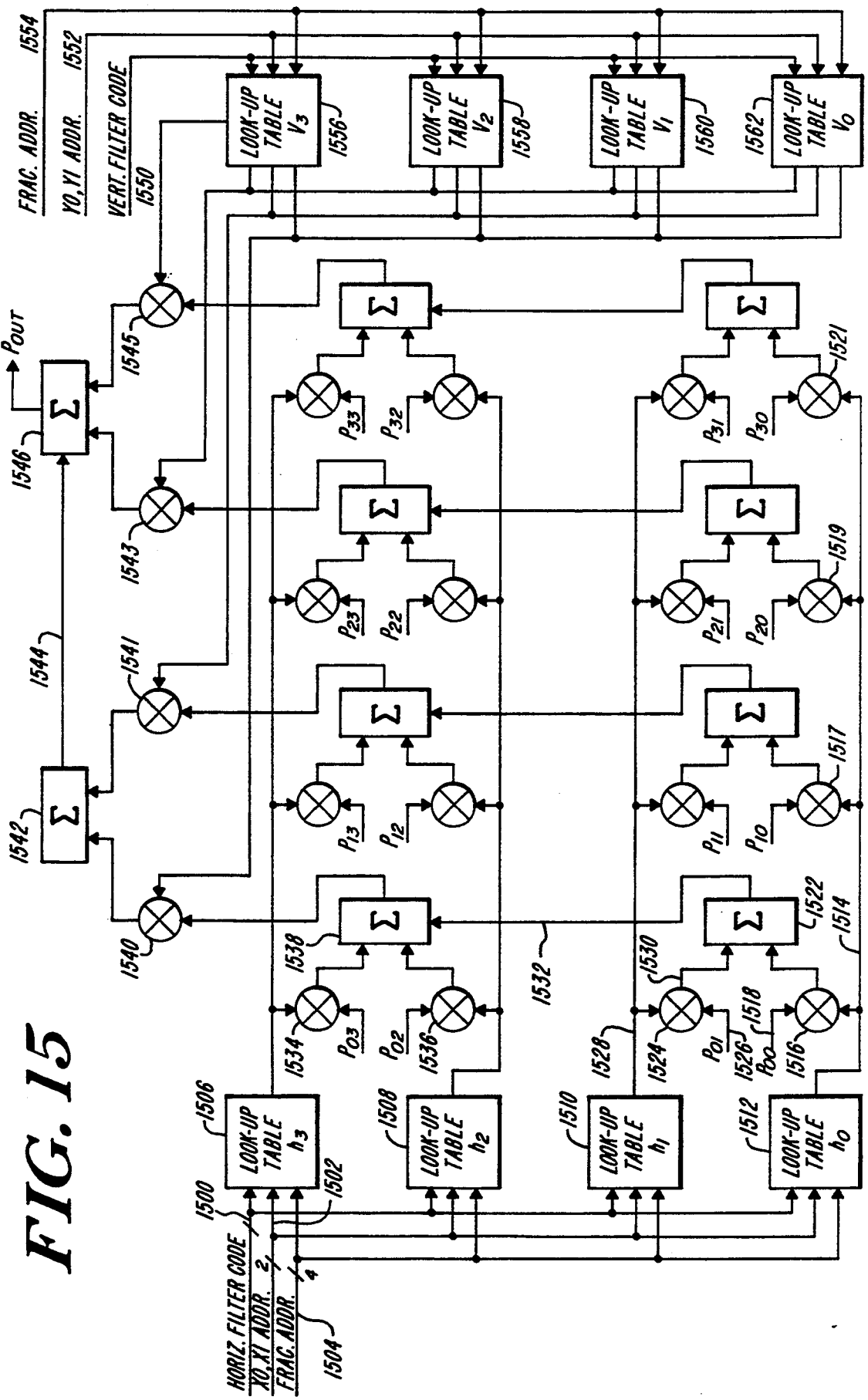
FIG. 15 is an electrical block schematic diagram of an illustrative four-by-four interpolator circuit.

More particularly, the target pixel luma information is provided from the filter/interpolator circuit shown in FIG. 15, via bus 1600, to video source selector 1604. In a similar manner, the target pixel chroma information is provided from the filter/interpolator circuit, via bus 1602, to video source selector 1606. Video source selectors 1604 and 1606 also receive, as additional inputs, via buses 1608 and 1610, luma and chroma information from a color source store 1638 which can be loaded with colored background information from system bus 1640. Selectors 1604 and 1606 can select either the target pixel information or the color source background information from store 1638 under control of decoder 1634 which receives the video source information from the patch detector, via bus 1632.

An independent key signal is also processed through the output video processor. This key signal may selectively be an external key signal or an internal key signal. An external key signal on bus 1618 is provided to key source selector 1616 which can choose between the external key on bus 1618 and an internal key generated on bus 1620 by key shaper 1626. Key shaper 1626, in turn, receives the single-bit key and the shadow signals from the patch detector over buses 1628 and 1630. If a single-bit key signal is received, it is used to access a ROM memory to generate an eight-bit key signal which can then be interpolated. The key shaper also performs horizontal and vertical filtering to produce pulse rise times which do not cause ringing. Key selector 1616 selects either the internal or external key information under control of signals generated at the user's control panel. The key selection information is forwarded to the output video processor via system bus 1640 and latched into decoder and latch circuit 1642. The latched information then controls key selector 1616 via buses 1646 and 1624.

The outputs of source selectors 1604, 1606 and 1616 on buses 1612, 1614 and 1622 are provided to a set of vertical and horizontal interpolators which selectively perform additional edge interpolation based on the fractional displacement information generated by the patch detector as previously described. This additional interpolation is necessary in cases where there is change from one video source to another over a patch boundary, or a patch has been "flipped" in orientation resulting in a video discontinuity at the patch boundary. This discontinuity cannot be accommodated by the interpolation process carried out by the aforementioned filter- /interpolator because that filter operates only on a 16-pixel array in one video buffer memory. Consequently, there is no "inter-buffer" interpolation in the filter/interpolator circuit.

In particular, the luma, chroma and key information is first subject to vertical interpolation by interpolators 1668, 1670 and 1672 under control of the vertical fractional displacement provided from the patch detector on bus 1680. In a similar manner, the output of vertical interpolators 1668-1672 is provided to horizontal interpolators 1674-1678 which provide horizontal interpolation under control of the horizontal fractional displacement generated by the patch detector on bus 1682.

Figure 20:
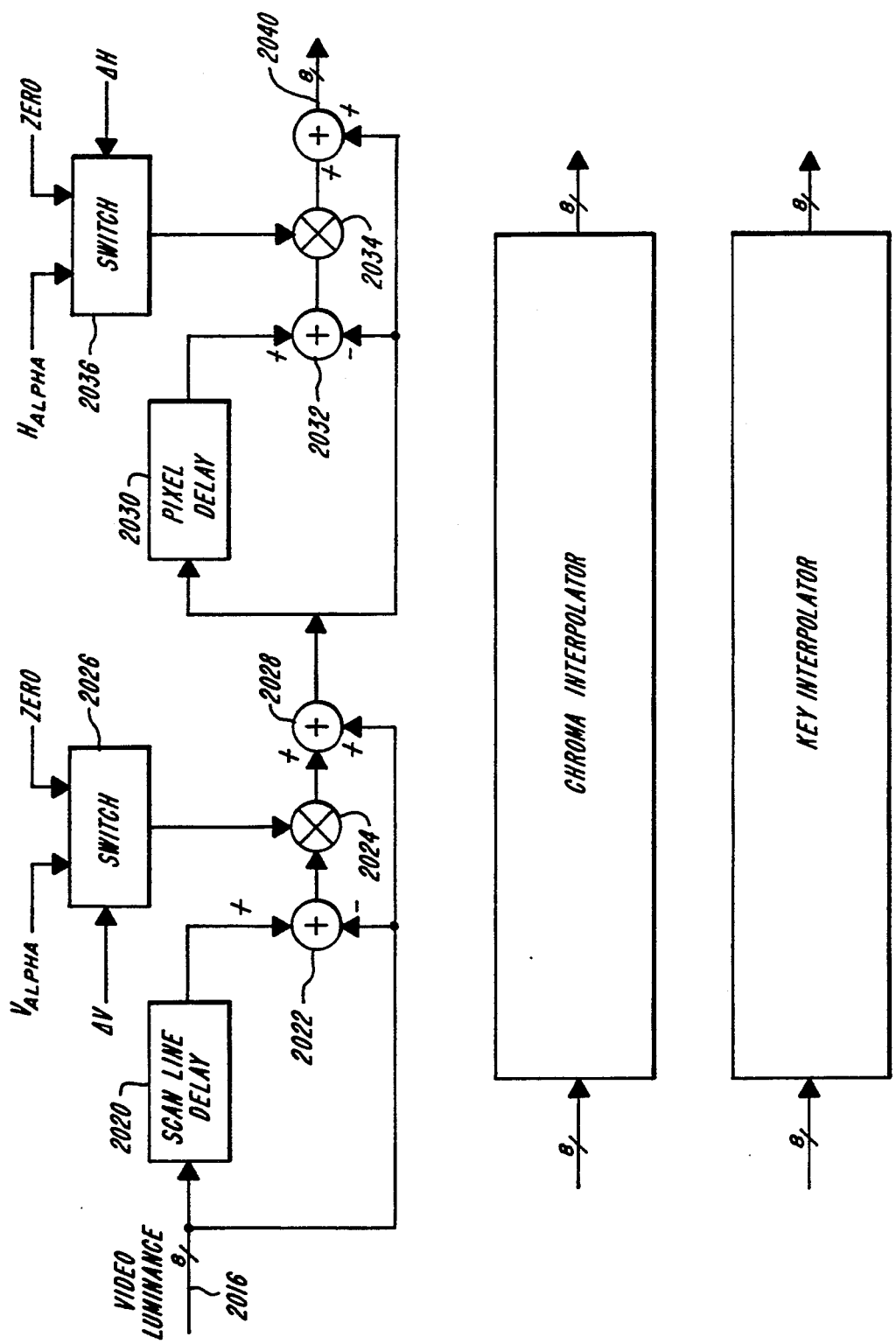
FIG. 20 is a detailed electrical block schematic diagram of the horizontal and vertical fractional interpolators used in the output video processor circuit.

The vertical and horizontal interpolators are shown in more detail in FIG. 20. As the interpolators for the luminance, chrominance and key information are identical only the luminance interpolator is shown in detail for clarity. The luminance interpolator receives eight-bit luminance information from the video source selector on input bus 2016. The interpolator also receives the vertical fractional displacement, V alpha, the horizontal fractional displacement H alpha and the as previously described. These signals are applied to a two-point vertical interpolator and a two-point horizontal interpolator. The interpolators perform the function $$a(D-P)+P \tag{13}$$

where a is the fractional displacement required, P is the present video pixel and D is a video pixel delayed by one scan line for vertical interpolation or by one pixel delay for horizontal interpolation. More particularly, the luminance information on bus 2016 is applied to a scan line delay circuit 2020. The delayed output of circuit 2020 is applied to one input of subtractor 2022. Subtractor 2022 subtracts the un-delayed input on bus 2016 from the delayed signal. The difference is multiplied by a selected number by multiplier 2024. The number applied to multiplier 2024 which multiplies the difference is controlled by switch 2026. Switch 2026 is, in turn controlled by the generated by the patch detector as previously described. If the boundary has been crossed, then switch 2026 is activated to apply the V alpha fractional displacement signal to multiplier 2024. Alternatively, if the V alpha signal is "low" indicating that no vertical boundary was crossed, then a "zero" is applied to multiplier 2024 causing no vertical interpolation to take place. The output of multiplier 2024 is summed with the original input in summer 2028 to generate the vertically-interpolated signal.

The interpolated signal is applied to pixel delay 2030 for horizontal interpolation. The delayed output of circuit 2020 is applied to one input of subtractor 2032. Subtractor 2032 subtracts the un-delayed input from summer 2028 from the delayed signal. The difference is multiplied by a selected number by multiplier 2034. The number applied to multiplier 2034 which multiplies the difference is controlled by switch 2036. Switch 2036 is, in turn controlled by the generated by the patch detector as previously described. If the boundary has been crossed, then switch 2036 is activated to apply the H alpha fractional displacement signal to multiplier 2034. Alternatively, if the H alpha signal is "low" indicating that no horizontal boundary was crossed, then a "zero" is applied to multiplier 2034 causing no horizontal interpolation to take place. The output of multiplier 2034 is summed with the original input in summer 2038 to generate the vertically and horizontally interpolated signal on bus 2040.

The interpolated luma, chroma and key information on buses 1684-1688, respectively, is provided to a special effects generator circuit 1654 which generates selected video special effects such as trails and sparkles and generates a color background key in a conventional manner. Unit 1654 operates under control of a latch signal on bus 1652 (generated by decoder and control latch circuit 1642), data received from the system computer via system data bus 1640 and timing information provided by timing pulse generator 1656 and also acts as a linear mixing circuit which places a colored background on the video in order to erase any unwanted artifacts from the transformation process.

After the special effects have been added by circuit 1654, the luma, chroma and key information is provided to blanking circuits 1666-1662 which insert blanking signals in a conventional manner under control of timing signals on lead 1660 generated by timing pulse generator 1656. Sync pulses and, for video signals, burst signals are added in a conventional fashion at this stage.

The processed luma information on bus 1690 is provided to summer 1694. Summer 1694 also receives processed chroma information which has been filtered by low-pass filter 1692 and re-encoded by encoder 1693 in a conventional manner. The output of summer 1694 is digital composite video which is converted into an analog signal by D/A converter 1695 and low-pass filter 1697. The composite video is output by video amplifiers 1699 and 1671.

In a similar manner, the blanked key signal on bus 1691 is converted into an analog signal by D/A converter 1696 and low-pass filter 1698 and provided as a composite key signal output via amplifier 1673.

System timing and genlock are provided by timing generator 1648 which processes a reference video signal to derive timing information. Reference video on lead 1644 is processed in circuit 1648 in a conventional fashion to isolate the sync and burst signals. A phase-locked-loop arrangement in circuit 1648 is used to generate a pixel clock whose phase tracks the burst on the reference video signal. Additional conventional circuits generate timing pulses, which represent the the start of a picture field, the start of each scan line and the phase of the color burst signal. These signals are used in the video field buffer, patch detector and manipulator circuits to synchronize the processing of the digital information.

FIG. 17 shows a timing chart of the special effects system illustrating the "pipeline" effect of the processing system. This diagram indicates, for seven separate video field times, the functions performed by various parts of the system during each field. During the normal operation of the system, pixel information corresponding to four separate fields is being processed simultaneously. FIG. 17 shows the system in a "startup mode" in which information begins to arrive at the system and slowly fills the "pipeline" of the processor.

More particularly, during the first video field (arbitrary designated as field no. "N"), the system computer computes and stores parameters for a video field arbitrarily labelled as picture, "PIX", A.

During the next video field (field N+1), the system computer sends the input source-to-patch assignment data to the input video processor utilizing the parameters computed in the previous field (field N). At the same time, the system computer computes and stores parameters for the next picture field (PIX B).

During the next subsequent video field (field N+2), the system computer sends line coefficients, patch numbers, orientations, patch priorities, and source switching parameters to the patch detector for the picture A (PIX A). In addition, the inverse or target-to-source transformation matrix coefficients and patch numbers are provided to the manipulator circuit for picture A. At the same time, the input video processor is sending the source pixel information to the field buffer memory for storage in accordance with the source-to-patch assignment data received from the system computer in video field N+1. The source pixel information forwarded by the input video processor to the video field buffer memory is written into the memory during field N+2.

During the next video field (field N+3), the patch detector determines a patch number for each of the target pixels and sends the patch numbers to the manipulator. The patch detector also determines the keystart and video switching information and forwards the latter information to the output video processor. During that same field (N+3), the manipulator circuit utilizes the patch numbers determined by the patch detector and computes field memory read addresses for each target pixel. These memory addresses are applied to the video field buffer memory which reads the source pixel information stored in the previous (field N+2) video field.

During the same video field (field N+3), the calcode circuit computes the filter codes necessary for the interpolation and the filter/interpolator circuit utilizes the information read from the video field buffer memory to generate the target pixel values. Also during the same video field (N+3), the output video processor switches the data sources to generate the complete picture and interpolates any key signals as necessary to generate the composite output key.

At each video field except for the first video field, the processing system is simultaneously processing pixel information from two or more separate video field pictures so that by the fourth video field, the system is simultaneously processing pixel information from four separate video pictures. This pipeline arrangement allows the video processor to process video effects information with only a three-field delay. The actual video delay through the system is one frame.

KEYFRAME OBJECT PARAMETERS

In accordance with the invention a new set of parameters is defined. This new set of parameters specifies a 3D "object" which is composed of a plurality of flat polygons that have been divided out of a flat source surface and manipulated in three dimensions to construct a desired shape. More particularly, the inventive parameter set adds twelve parameters to the conventional set of parameters for manipulating flat planes in three dimensions. As previously mentioned, these fourteen conventional parameters include:

1) three (X, Y and Z) position parameters;
2) three rotation angles to define plane orientation;
3) three (X, Y and Z) scaling parameters to squash or stretch the plane in its 3D position and orientation;
4) four (top, bottom, right and left) cropping parameters to selectively remove the four edges of the plane; and
5) a perspective viewing distance parameter to control the amount of perspective.

In accordance with the invention, rather than controlling a flat plane in 3D, the above-mentioned parameters will control the position and orientation of a real 3D object composed of many planes. The new parameters (or variables) will control the shape, size, look and feel of the constructed 3D object.

The inventive parameters fall into two categories: a set of parameters which control the division of the source plane into patches and a set of parameters which control how these patches are 'folded' into 3D objects.

Patch division parameters include:

1) "patch orientation angle" which define the orientation of the patch and constructed surface axes with respect to the source plane;
2) "patch distribution center" which changes the location of the central patch with respect to the center of the viewing plane;
3) "patch distribution width" which expands and compresses the curved areas of the constructed object;
4) "cone" which changes the initial patch division from parallel sides to non-parallel sides; and
5) "curve" which controls the amount of object curvature.

The effect of changing patch orientation angle is shown in FIGS. 22A-22C and 22-1 to 22-3. This figure shows a 'page turn' effect (or partial cylinder) with different values of the patch orientation parameter. FIGS. 22A-22C show the source plane with a set of superimposed patches with three different patch orientations. Illustratively, each patch is comprised of a long rectangle with parallel sides and the patches are located adjacent to each other to form a band. The remaining parameters (patch distribution center, patch distribution width, cone and curve) remain constant in FIGS. 22A-22C.

FIGS. 22-1 through 22-3 show the resulting 3D surface constructed by the aforementioned video special effects system in response to the parameter inputs specified in FIGS. 22A-22C, respectively. The effect created is a flat plane with one corner flipped up. The corner which is moved is determined by the parameter value and appears to rotate.

Figure 25F:
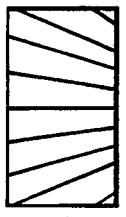
FIGS. 25A-25F illustrate the source video plane and the effect on patch placement of changing the cone parameter.
Figure 25E:
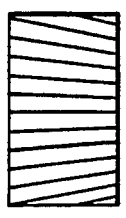
Figure 25D:
Figure 25C:
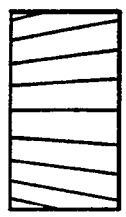
Figure 25B:
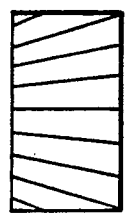
Figure 25A:
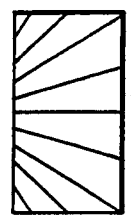
Figures 6, 25:
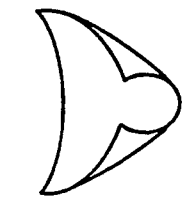
Figures 5, 25:
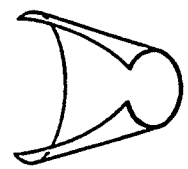
Figures 4, 25:
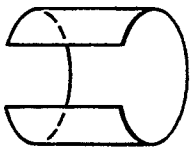
Figures 3, 25:
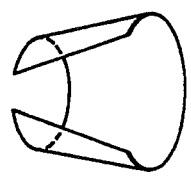
Figures 2, 25:
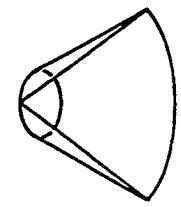
Figures 1, 25:
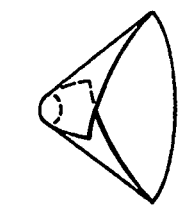

FIGS. 23A-23F and 23-1 to 23-6 show the effect of varying the patch distribution center parameter. As with FIGS. 22A-22C, FIGS. 23A-23F show the source plane with a set of superimposed patches with three different patch distribution centers. Illustratively, each patch is comprised of a long rectangle with parallel sides and the patches are located adjacent to each other to form a band. FIGS. 23-1 through 23-6 show the final effect. First one corner flips up (FIG. 23-2). Then the video is sequentially pulled over (FIGS. 23-3 to 23-5) until it is upside down and sliding on a new plane off the screen (FIG. 23-6).

FIGS. 24A-24C and 24-1 to 24-3 show the effect of varying the patch distribution width parameter. FIGS. 24A-24C show the source plane with three different distribution widths. The resulting constructed surface is shown in FIGS. 24-1 through 24-3 and appears as a page-turn or half-cylinder effect. A full 180 degree bend will occur in the area of the small patches (FIGS. 24A and 24-1). As this area is expanded from a small distribution size to a large distribution size, the shape changes from a "book-shaped" one to a fully-curved half cylinder (FIGS. 24C and 24-3).

The "cone" parameter changes the shape of the initial patch division from patches with parallel sides to patches which are "radial" or are formed by lines radiating from a common central point. FIGS. 25A–25F and 25-1 to 25-6 illustrate how a change in the cone parameter changes the shape of patches and the resulting 3D constructed surfaces. In FIGS. 25A–25F and 25-1 to 25-6, the patch distribution width is the width of the output display, the patch distribution center coincides with the center of the display and the patch orientation is vertical. FIGS. 25A–25F show the source plane with applied patches with a change in the cone parameter which causes the central point from which the patches radiate to move from a point located below the source plane to a point located above the source plane. The resulting 3D surface is shown in FIGS. 25-1 to 25-6 and changes from a "down-pointing funnel" through a cylinder to an "up-pointing funnel".

The curve parameter controls the amount of curvature produced by the other parameters. By itself, it does not introduce any additional effects.

Each of the successive figures shown above could represent a keyframe in a special effects sequence. Although in the examples shown, only a single parameter changes in each of the views, any or all of the parameters could simultaneously change. In addition, the conventional parameters of position, rotation, scaling and perspective could also be changed to change the viewer's vantage point. To program these effects using the conventional keyframe method, the user would initially set all parameters to desired values in the first keyframe. Then he would create the last keyframe of the series and again set all parameters to desired values. Next he would insert several new keyframes between the first and last keyframe by copying the first keyframe. Finally, the user would edit all the keyframes by selectively making changes of each parameter.

In all the preceeding examples, the angles between each patch and its neighboring patches are constant over the entire object. Additional parameters are provided to vary the angles between patches to create different effects. These additional parameters include:
6) "cylinder fraction" which curves the source plane from flat to a partial or complete cylinder.
7) "bend center" which determines the part of the output display that moves away from the source plane and the part that stays on the source plane.
8) "number of waves" which adds waves to flat planes, cylinders, page turns, etc.
9) "wave phase" which makes waves undulate.
10) "wave fraction" which changes wave amplitude.
11) "spiral fraction—type 1" which curves the source plane from flat into a spiral.
12) "spiral fraction—type 2" which produces an effect similar to spiral fraction—type 1, but produces two spirals on the same side of the plane, like a scroll unrolling from the middle outward in two directions.

FIGS. 26A–26C and 26-1 to 26-3 show the effect of the cylinder fraction parameter. In FIGS. 26A–26C, the patch pattern remains the same with the source plane evenly divided by rectangular patches as shown. This patch pattern is also used in the following figures. As the cylinder fraction parameter increases from a minimum value to a maximum value (FIGS. 26-1 to 26-3) the flat source plane is curled gradually into a cylinder.

Figure 27A:
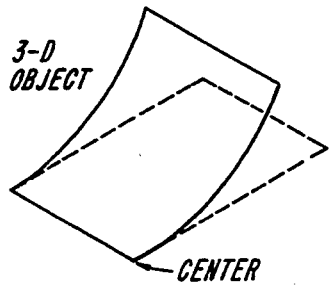
FIGS. 27A-27C illustrate the effect on the constructed 3D object of changing the bend center parameter.
Figure 27B:
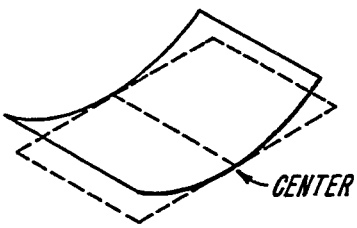
Figure 27C:
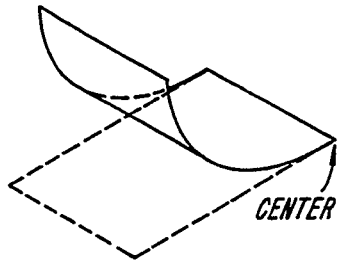
Figure 28A:
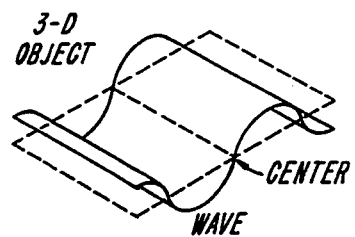
FIGS. 28A-28C illustrate the effect on the constructed 3D object of changing the wave number parameter.
Figure 28B:
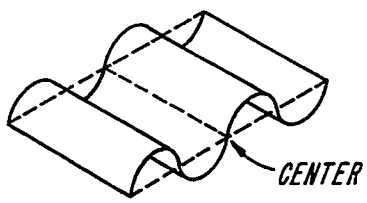
Figure 28C:
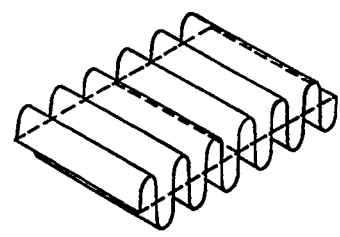

FIGS. 27A–27C show the effect of the bend center parameter. At a minimum value (FIG. 27A), the left edge of the 3D object remains fixed and tangent to the source plane and the right side of the 3D object moves away from the plane. At a central value (FIG. 27B), the center of the 3D object remains fixed and both left and right-hand edges move away from the plane simultaneously. At a maximum value (FIG. 27C), the right edge of the 3D object remains fixed and tangent to the source plane and the left side of the 3D object moves away from the plane FIGS. 28A–28C show the effect of varying the number of waves. FIG. 28A shows the 3D object with a minimum number of waves. FIG. 28B shows the number of waves increasing as the value of the parameter increases. FIG. 28C shows a further increase. At maximum value of the wave number parameter, the 3D object is an accordion-shaped object with the maximum number of patches.

Figure 29:
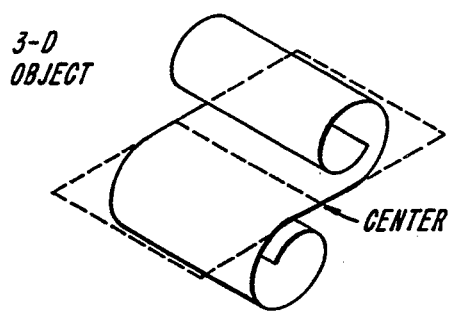
FIG. 29 illustrates the effect on the constructed 3D object of changing the type 1 spiral fraction parameter.

FIG. 29 shows the effect of the type 1 spiral fraction parameter. As the value of the parameter increases, the source plane is curved into a spiral. If the bend center parameter is mid-value (as shown in FIG. 29) each half of the source plane is curled into 360-degree spirals on opposite sides of the source plane. If the bend center is maximum or minimum, the maximum value of the type 1 spiral fraction parameter creates a 3D object with a single spiral of four revolutions.

Figure 30:
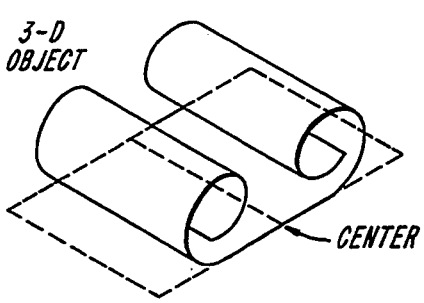
FIG. 30 illustrates the effect on the constructed 3D object of changing the type 2 spiral fraction parameter.

FIG. 30 shows the effect of the type 2 spiral fraction parameter. As the value of the parameter increases, the source plane is curved into a spiral. If the bend center parameter is mid-value (as shown in FIG. 29) the 3D object is similar to that produced by the type 1 spiral fraction parameter except that the two spirals are on the same side of the source plane, like a scroll unrolling from the middle outward in two directions. As with the type 1 spiral fraction parameter, if the bend center is maximum or minimum, the maximum value of the type 2 spiral fraction parameter creates a 3D object with a single spiral of four revolutions.

Although only one illustrative embodiment of the invention has been shown, other changes and modifications will immediately become obvious to those skilled in the art which changes in modifications are intended to be covered by the following claims.

What is claimed is:

1. A method for controlling a patch-driven video 3D special effects system which constructs an output display of a desired three-dimensional shape with real-time video picture information displayed on a surface of said shape, by dividing a video source plane into a plurality of polygonal patches and manipulating said patches in three dimensions to create said shape, said method comprising the steps of:

A) receiving a plurality of inputs from a user defining a plurality of control parameters;
B) dividing said source plane into a plurality of polygonal patches by means of a number of straight line segments, the number of said patches determined by a first of said control parameters, said line segments being segments of lines that emanate from a point located at a position determined by a second of said control parameters;
C) rotating at least one of said patches around one of said straight line segments at an angle specified by at least a third one of said control parameters to construct said shape having a size, orientation and position; and
D) manipulating said shape size, said shape orientation and said shape position in accordance with a fourth, fifth and sixth of said control parameters.

2. A method for controlling a patch-driven video special effects system according to claim 1 wherein step A comprises the steps of:
   A1. displaying said control parameters to said user; and
   A2. adjusting the control parameters displayed in step A1 in accordance with said inputs received from said user.

3. A method for controlling a patch-driven video 3D special effects system according to claim 1 wherein step B comprises the steps of:
   B1. determining the number of said lines in accordance with one of said control parameters; and
   B2. determining vertices for each patch to be the points where said lines intersect the edges of said source plane.

4. A method for controlling a patch-driven video 3D special effects system according to claim 3 wherein step C comprises the steps of:
   C1. moving said vertices with respect to said source plane cause a rotation of said patch around said one line segment.

* * * * *